(12) United States Patent
Coogan et al.

(10) Patent No.: US 9,786,397 B2
(45) Date of Patent: Oct. 10, 2017

(54) CASK TRANSPORT ASSEMBLY

(71) Applicant: Konecranes Plc, Hyvinkää (FI)

(72) Inventors: Steve Coogan, South Milwaukee, WI (US); Michael Waedekin, Mukwonago, WI (US); Joseph A. Yustus, Hartford, WI (US)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 14/597,960

(22) Filed: Jan. 15, 2015

(65) Prior Publication Data

US 2015/0125244 A1 May 7, 2015

Related U.S. Application Data

(63) Continuation-in-part of application No. 13/941,407, filed on Jul. 12, 2013, now Pat. No. 9,343,191.

(Continued)

(51) Int. Cl.
| | |
|---|---|
| *G21F 5/14* | (2006.01) |
| *B60P 3/00* | (2006.01) |
| *B66C 19/00* | (2006.01) |
| *B66C 1/66* | (2006.01) |
| *B66C 19/02* | (2006.01) |

(52) U.S. Cl.
CPC .................. *G21F 5/14* (2013.01); *B60P 3/00* (2013.01); *B66C 1/66* (2013.01); *B66C 19/005* (2013.01); *B66C 19/02* (2013.01)

(58) Field of Classification Search
CPC .. G21F 5/14; B66C 19/02; B66C 1/14; B66C 1/66; G21C 19/32
See application file for complete search history.

(56) References Cited

U.S. PATENT DOCUMENTS

| 2,078,122 A | 4/1937 | Burns et al. |
| 2,717,184 A | 9/1955 | Amerman |
| (Continued) | | |

FOREIGN PATENT DOCUMENTS

| CN | 101462672 | 6/2009 |
| CN | 201330120 | 10/2009 |
| (Continued) | | |

OTHER PUBLICATIONS

International Search Report for International Application No. PCT/IB2013/001522 dated Jan. 3, 2014 (6 pages).

(Continued)

*Primary Examiner* — Jonathan Snelting

(74) *Attorney, Agent, or Firm* — Michael Best & Friedrich LLP

(57) ABSTRACT

A low profile transport device includes a frame having a top surface and a recess disposed along the top surface to hold and transport an object. The low profile transport device also includes a plurality of wheels disposed below the frame that support the frame, and a plurality of pivotable wheel struts coupled to the wheels. The wheel struts are each individually adjustable relative to the frame from a first position relative to the frame to a second position relative to the frame to allow the low profile transport device to climb an obstacle without tilting the frame. The low profile transport device also includes a motor that generates movement of the wheels.

25 Claims, 35 Drawing Sheets

Related U.S. Application Data

(60) Provisional application No. 61/671,507, filed on Jul. 13, 2012.

(56) References Cited

U.S. PATENT DOCUMENTS

| | | | |
|---|---|---|---|
| 2,772,411 A | | 11/1956 | Cooper |
| 3,421,635 A | | 1/1969 | Bunger |
| 3,428,194 A | | 2/1969 | Weiss |
| 3,848,750 A | | 11/1974 | Hoge |
| 4,027,800 A | | 6/1977 | Polen |
| 4,069,921 A | | 1/1978 | Raugulis et al. |
| 4,073,476 A | | 2/1978 | Frank |
| 4,273,243 A | | 6/1981 | Locher |
| 4,381,839 A | | 5/1983 | Engler et al. |
| 4,576,100 A | | 3/1986 | Zanin |
| 4,743,893 A | | 5/1988 | Gentile et al. |
| 5,735,416 A | | 4/1998 | Jussila |
| 5,839,874 A | * | 11/1998 | Johnston ............... B66C 19/005 414/459 |
| 5,967,348 A | | 10/1999 | Jussila |
| 6,345,724 B1 | | 2/2002 | Masumoto et al. |
| 6,674,828 B1 | | 1/2004 | Weber et al. |
| 7,270,312 B1 | | 9/2007 | Phipps |
| 7,547,177 B2 | | 6/2009 | Waisanen |
| 7,775,571 B2 | * | 8/2010 | Waisanen ............... B66C 1/422 294/112 |
| 8,025,341 B2 | * | 9/2011 | Bjornson ............... B03B 9/02 299/1.9 |
| 8,322,687 B2 | | 12/2012 | Faccio et al. |
| 8,401,814 B1 | | 3/2013 | Kureck |
| 8,526,565 B2 | | 9/2013 | Waisanen |
| 8,573,921 B2 | | 11/2013 | Waisanen |
| 8,616,527 B2 | | 12/2013 | Cho |
| 9,108,556 B2 | * | 8/2015 | Terry |
| 2002/0001515 A1 | | 1/2002 | Lukumaa et al. |
| 2003/0006207 A1 | | 1/2003 | Norheim |
| 2003/0111651 A1 | | 6/2003 | Volle et al. |
| 2003/0180132 A1 | | 9/2003 | Morreim |
| 2008/0085177 A1 | | 4/2008 | Waisanen |
| 2009/0123255 A1 | * | 5/2009 | Waisanen ............... B66C 17/00 414/146 |
| 2009/0159550 A1 | | 6/2009 | Singh et al. |
| 2009/0230368 A1 | * | 9/2009 | Marsh .................... B66F 5/04 254/35 |
| 2011/0094815 A1 | | 4/2011 | Terry |
| 2013/0045070 A1 | | 2/2013 | Waisanen et al. |
| 2013/0121796 A1 | * | 5/2013 | Terry ...................... B60P 1/00 414/495 |
| 2014/0017051 A1 | * | 1/2014 | Coogan ................... G21F 5/14 414/618 |

FOREIGN PATENT DOCUMENTS

| | | |
|---|---|---|
| CN | 201647833 | 11/2010 |
| CN | 201932854 | 8/2011 |
| CN | 102548889 | 7/2012 |
| DE | 6802364 | 2/1969 |
| DE | 2439667 | 3/1976 |
| RU | 1794859 | 2/1993 |
| RU | 2352516 | 4/2009 |
| WO | 2011089315 | 7/2011 |
| WO | 2014009801 | 1/2014 |

OTHER PUBLICATIONS

Written Opinion from the International Searching Authority for International Application No. PCT/IB2013/001522 dated Jan. 3, 2014 (11 pages).

International Search Report for International Application No. PCT/IB2013/001522 dated Mar. 1, 2014 (3 pages).

Office Action from the United States Patent and Trademark Office for U.S. Appl. No. 13/941,407 dated Jan. 14, 2015 (24 pages).

Office Action from the United States Patent and Trademark Office for U.S. Appl. No. 13/941,400 dated Feb. 13, 2015 (24 pages).

Notification of First Office Action from The State Intellectual Property Office of the People's Republic of China for Application No. 201380037358.5 dated Apr. 28, 2016 (8 pages).

Search Report from The State Intellectual Property Office of the People's Republic of China for Application No. 201380037358.5 dated Apr. 28, 2016 (3 pages).

Examination Report from the European Patent Office for Application No. 13780190.8 dated Mar. 31, 2016 (12 pages).

English translation of Notification of the Second Office Action and Search Report from The State Intellectual Property Office of the People's Republic of China for Application No. 201380037358.5 dated Nov. 2, 2016 (24 pages).

Russian Patent Office Action for Application No. 2015104799 with English Translation dated Jul. 4, 2017 (pages).

* cited by examiner

CASK TRANSPORT ASSEMBLY

CROSS-REFERENCE TO RELATED APPLICATIONS

This application is a continuation-in-part of U.S. application Ser. No. 13/941,407, which claims the benefit of U.S. Provisional Application No. 61/671,507, filed Jul. 13, 2012, the entire contents of each of which are herein incorporated by reference.

FIELD OF INVENTION

The present invention relates to lifting and transporting of casks and multi-purpose canisters in the nuclear power field. Specifically, the present invention relates to lifting and transporting spent nuclear fuel casks and canisters.

BACKGROUND

Canisters are commonly used to hold nuclear fuel in the nuclear power field. Once these canisters have been used and are spent, the canisters need to be transported to large storage tanks positioned in pits in the ground for safety reasons. The process of lifting and transporting spent nuclear fuel canisters requires careful planning and precision. In particular, it is possible for seismic or other movement events to take place during the transport of the canisters, particularly in regions of the world susceptible to earthquakes. Additionally, it is possible to have single failures within a transport system (e.g., a component breaking) during the transport of canisters. Without a system built to handle these types of events, the canisters could tip, fall, be released, and/or otherwise be damaged or compromised.

SUMMARY

In one construction, the invention provides a cask transport system that includes a support assembly including a plurality of wheels and a support frame coupled to and supported by the wheels. The cask transport system also includes a tower disposed above the support assembly, the tower including a base portion and a tower frame coupled to the base portion, the tower frame movable relative to the base portion. The cask transport system also includes an upper beam assembly coupled to the tower frame, and a bottom block assembly coupled to the upper beam assembly, the bottom block assembly movable relative to the upper beam assembly In another construction, the invention provides a cask transport system that includes a support assembly including a plurality of wheels and a support frame coupled to and supported by the wheels. The cask transport system also includes a tower disposed above the support assembly, the tower including a base portion and a plurality of tower frames coupled to the base portion, the tower frames movable relative to each other and to the base portion. The cask transport system also includes an upper beam assembly coupled to the tower frames, the upper beam assembly including a plurality of pulley systems. The cask transport system also includes a bottom block assembly coupled to the upper beam assembly, the bottom block assembly movable relative to the upper beam assembly via the pulley systems.

In another construction, the invention provides a method of using a cask transport system having a support assembly including a plurality of wheels and a support frame coupled to and supported by the wheels, a tower disposed above the support assembly, the tower including a base portion and a tower frame coupled to the base portion, an upper beam assembly coupled to the tower frame, and a bottom block assembly coupled to the upper beam assembly. The method includes coupling the bottom block assembly to a canister, changing the vertical position of the tower frame relative to the base portion, and changing the vertical position of the bottom block assembly relative to the upper beam assembly.

In another construction, the invention provides a cask transport system including a support assembly including a plurality of wheels and a support frame coupled to and supported by the wheels. The cask transport system also includes a tower disposed above the support assembly. The cask transport system also includes an upper beam assembly coupled to the tower frame, the upper beam assembly including a winch drum. The cask transport system also includes a bottom block assembly coupled to the upper beam assembly, the bottom block assembly movable from a first vertical position relative to the upper beam assembly to a second vertical position relative to the upper beam assembly.

In another construction, the invention provides a method of using a cask transport system having a support assembly including a plurality of wheels and a support frame coupled to and supported by the wheels, a tower disposed above the support assembly, the tower including a base portion and a tower frame coupled to the base portion, an upper beam assembly coupled to the tower frame, and a bottom block assembly coupled to the upper beam assembly, the upper beam assembly including a support arm extending beneath the upper beam assembly. The method includes changing the vertical position of the tower frame relative to the base portion, coupling the support arm of the upper beam assembly to a storage tank, moving the cask transport system from a first location to a second location with the storage tank coupled to the upper beam assembly, and lowering the storage tank into a pit at the second location.

In another construction, the invention provides a method of transporting a canister with a cask transport system having a support assembly including a plurality of wheels and a support frame coupled to and supported by the wheels, a tower disposed above the support assembly, the tower including a base portion and a tower frame coupled to the base portion, an upper beam assembly coupled to the tower frame, and a bottom block assembly coupled to the upper beam assembly, the upper beam assembly including a support arm extending beneath the upper beam assembly. The method includes moving a cask underneath the support arm, the cask including a canister disposed inside the cask. The method also includes changing the vertical position of the tower frame relative to the base portion, coupling the support arm to the cask, and raising the cask. The method also includes moving the cask transport system from a first location to a second location with the cask coupled to the upper beam assembly.

In another construction, the invention provides a low profile transport device that includes a frame having a top surface and a recess disposed along the top surface to hold and transport an object. The low profile transport device also includes a plurality of wheels disposed below the frame that support the frame, and a plurality of pivotable wheel struts coupled to the wheels. The wheel struts are each individually adjustable relative to the frame from a first position relative to the frame to a second position relative to the frame to allow the low profile transport device to climb an obstacle without tilting the frame. The low profile transport device also includes a motor that generates movement of the wheels.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
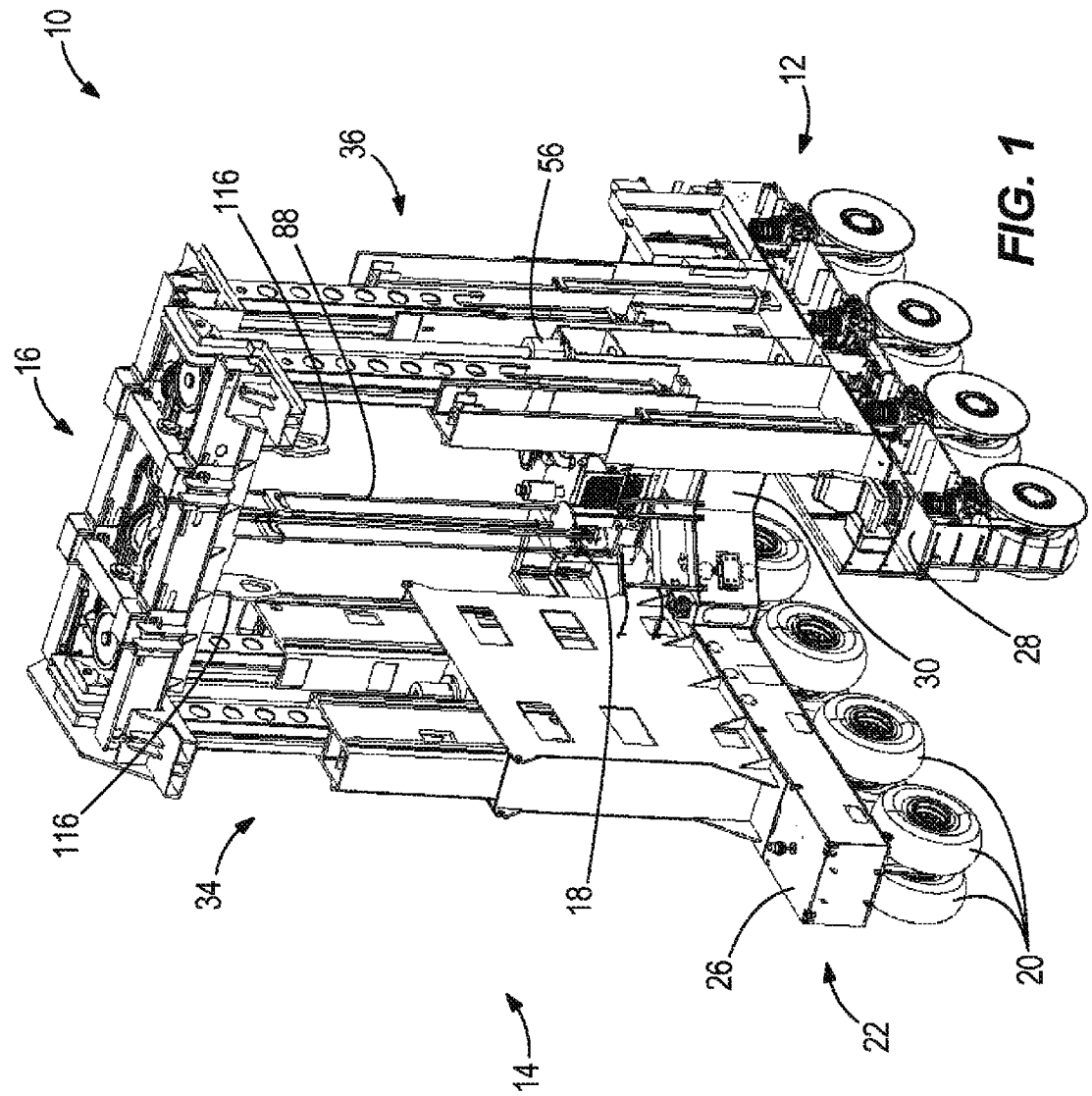
FIG. 1 is a front perspective view of a cask transport assembly according to one construction of the invention, with a second leg portion of the assembly system shown in cross section.

FIG. 1 illustrates a cask transport assembly 10 including a support assembly 12, a tower 14, an upper beam assembly 16 and a bottom block assembly 18. The support assembly 12 includes wheels 20 (e.g., sixteen in the illustrated construction), a U-shaped frame 22 and a prime mover 24. The frame 22 includes first and second legs 26, 28 and a middle portion 30. Each of the legs 26, 28 is supported on eight of the plurality of wheels 20. The prime mover 24 is supported on the middle portion 30. The prime mover 24 is part of a hydraulic system that is operable to drive the wheels 20 and thereby move the U-shaped frame 22, as well as actuate the various hydraulic cylinders described herein. Other arrangements and configurations are possible, and the illustrated construction is given by way of example only.

As shown in FIG. 1, the tower 14 includes a first side 34 and a second side 36, which is substantially a mirror-image of the first side 34. The first side 34 is coupled to the first leg 26, while the second side 36 is coupled to the second leg 28. Because the first side 34 is a substantial mirror-image of the second side 36, only the second side 36 will be discussed in detail; however, the discussion of the second side 36 applies equally to the first side 34. A portion of the second side 36 is shown in cross section.

Figure 2:
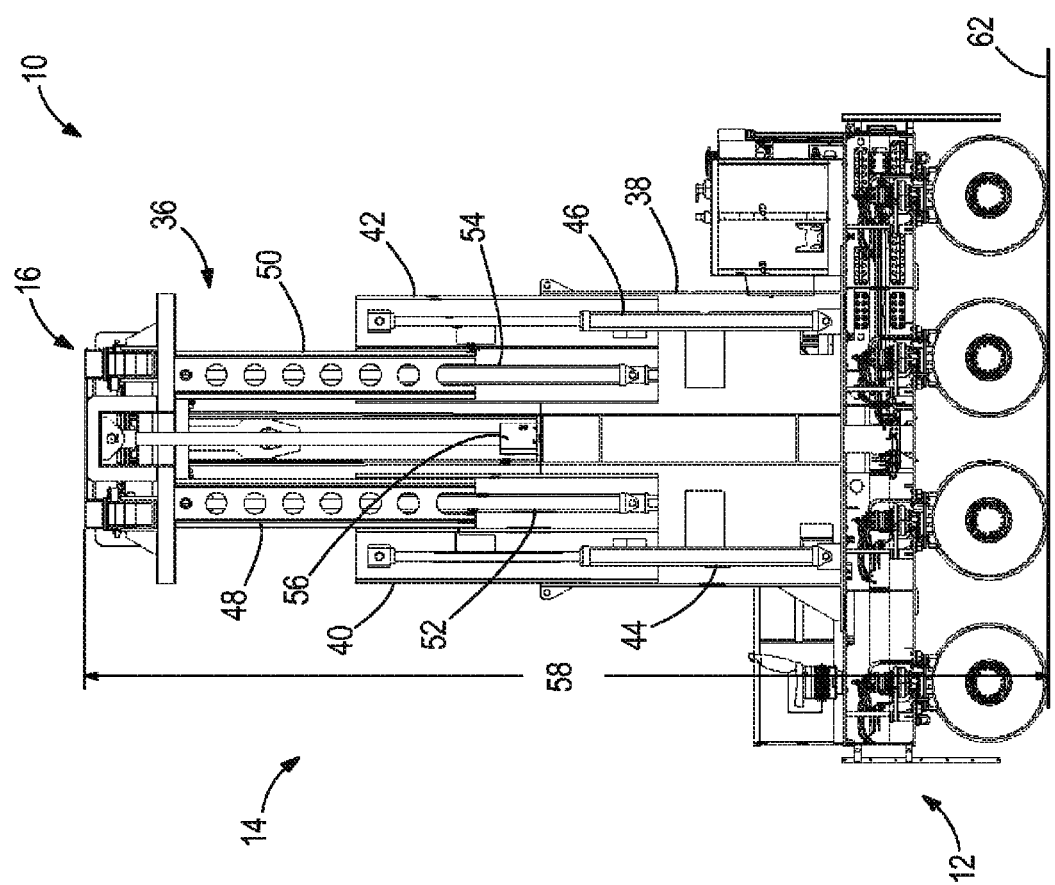
FIG. 2 is a side view of the assembly shown in FIG. 1 with hydraulic cylinders shown in a fully extended position.
Figure 3:
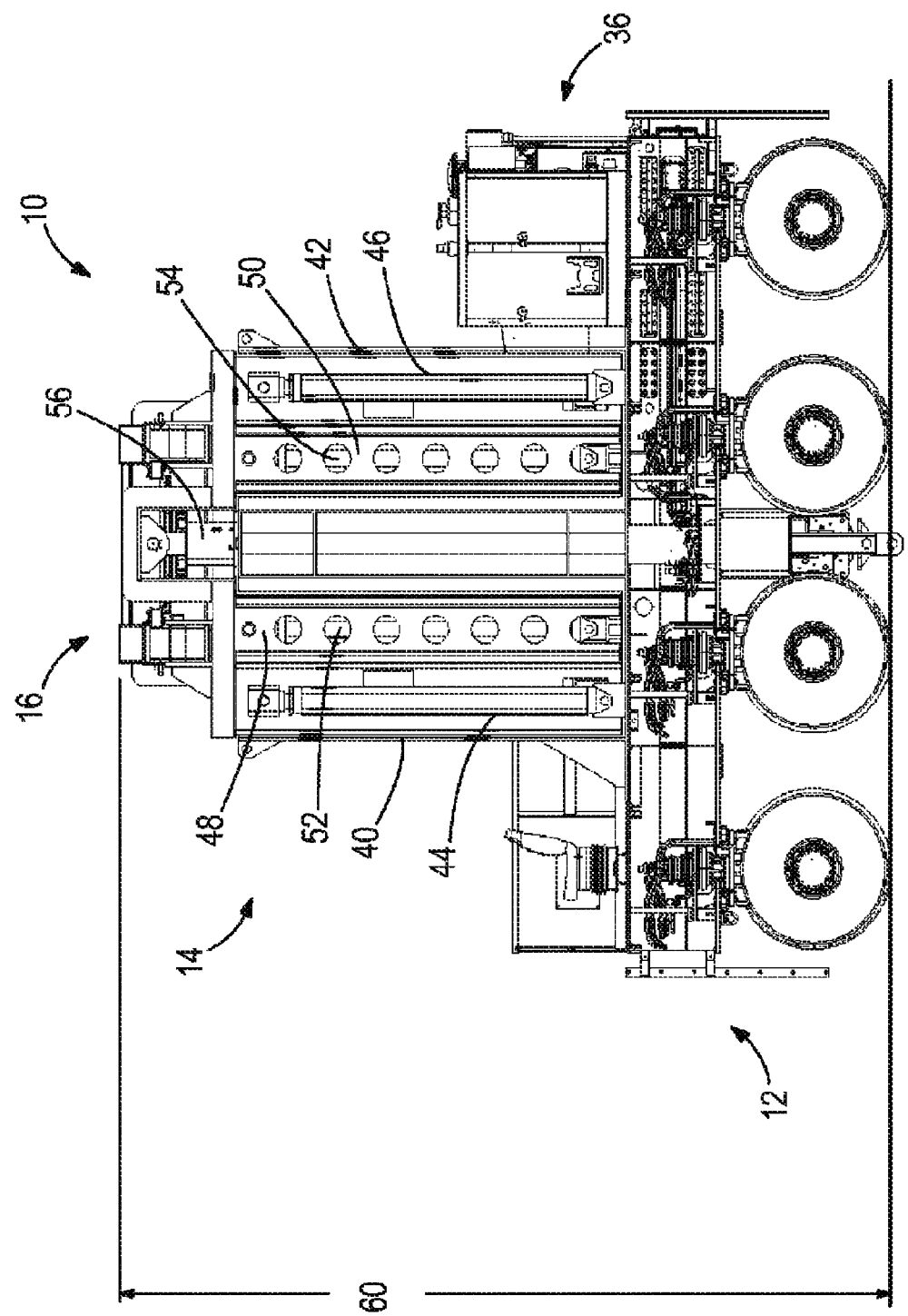
FIG. 3 is similar to FIG. 2, but illustrates the hydraulic cylinders in a fully retracted position.

Turning now to FIGS. 2 and 3, the second side 36 is shown in greater detail. The second side 36 includes a base portion 38, a first pair of moving frames 40, 42, a first pair of hydraulic cylinders 44, 46, a second pair of moving frames 48, 50, a second pair of hydraulic cylinders 52, 54, and a safety catch 56. The base portion 38 is substantially fixed to the second side 36 of the frame 22 and extends upwardly therefrom. The base portion 38 is a substantially hollow rectangular frame.

The first pair of moving frames 40, 42 are coupled to the base portion 38 and telescope vertically in and out of the substantially hollow rectangular frame defined by the base portion 38. The first pair of moving frames 40, 42 are substantially hollow rectangular frames. The first pair of hydraulic cylinders 44, 46 are coupled to the base portion 38 at one end and to a respective one of the first pair of moving frames 40, 42 at the other end. The first pair of hydraulic cylinders 44, 46 are heavy duty double-acting hydraulic cylinders and are operable to move the first pair of moving frames 40, 42 vertically both up and down. FIG. 2 shows the first pair of hydraulic cylinders 44, 46 in a fully extended position, whereas FIG. 3 shows the first pair of hydraulic cylinders 44, 46 in a fully retracted position.

The second pair of moving frames 48, 50 are coupled to the respective first pair of moving frames 40, 42 and telescope vertically in and out of the substantially hollow rectangular frames defined by the first pair of moving frames 40, 42. The second pair of moving frames 48, 50 are substantially hollow rectangular frames. The second pair of hydraulic cylinders 52, 54 are coupled to the first pair of moving frames 40, 42 on one end and to the upper beam assembly 16 at the other end. The second pair of hydraulic cylinders 52, 54 are heavy duty double-acting hydraulic cylinders and are operable to move the second of moving frames 48, 50 vertically both up and down. FIG. 2 shows the second pair of hydraulic cylinders 52, 54 in a fully extended position, whereas FIG. 3 shows the second pair of hydraulic cylinders 52, 54 in a fully retracted position. In some constructions, the first pair of hydraulic cylinders 44, 46 are fully extended before the second pair of hydraulic cylinders 52, 54 begin to extend.

The safety catch 56 is included to catch the upper beam assembly 16 in the event of hydraulic pressure loss.

FIG. 2 illustrates the upper beam assembly 16 spaced a first distance 58 from a support surface 62 (e.g., the ground). In some constructions, the first distance 58 is between about 17 feet and about 58 feet. In some constructions, the first distance 58 is between about 25 feet and about 50 feet. In some constructions, the first distance 58 is between about 33 feet and about 42 feet.

FIG. 3 illustrates the upper beam assembly 16 spaced a second distance 60 from the support surface 62. In some constructions, the second distance 60 is between about 4 feet and about 42 feet. In some constructions, the second distance 60 is between about 12 feet and about 33 feet. In some constructions, the second distance 60 is between about 21 feet and about 25 feet.

Figure 4:
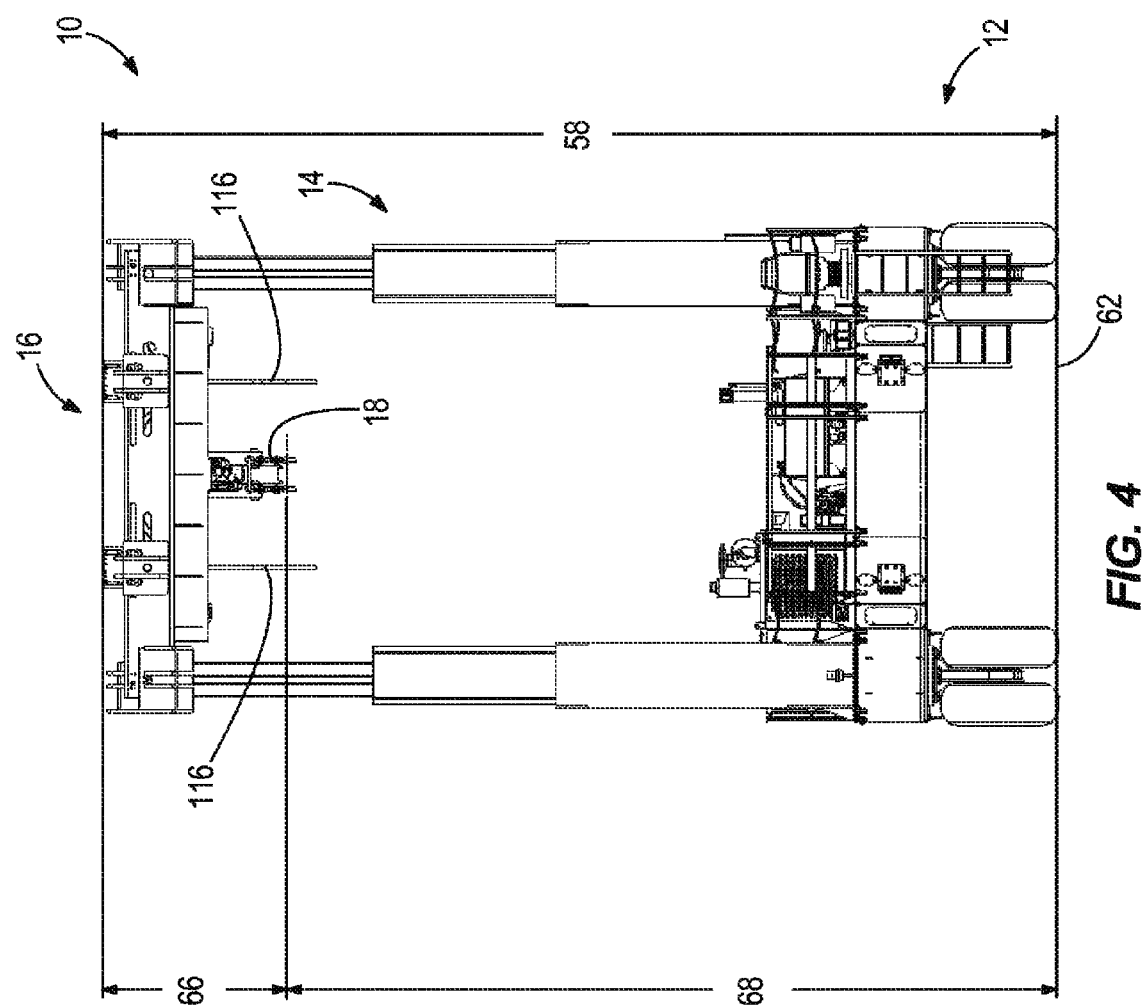
FIG. 4 is a front view of the cask transport assembly with the bottom block assembly in a first, stowed position.
Figure 5:
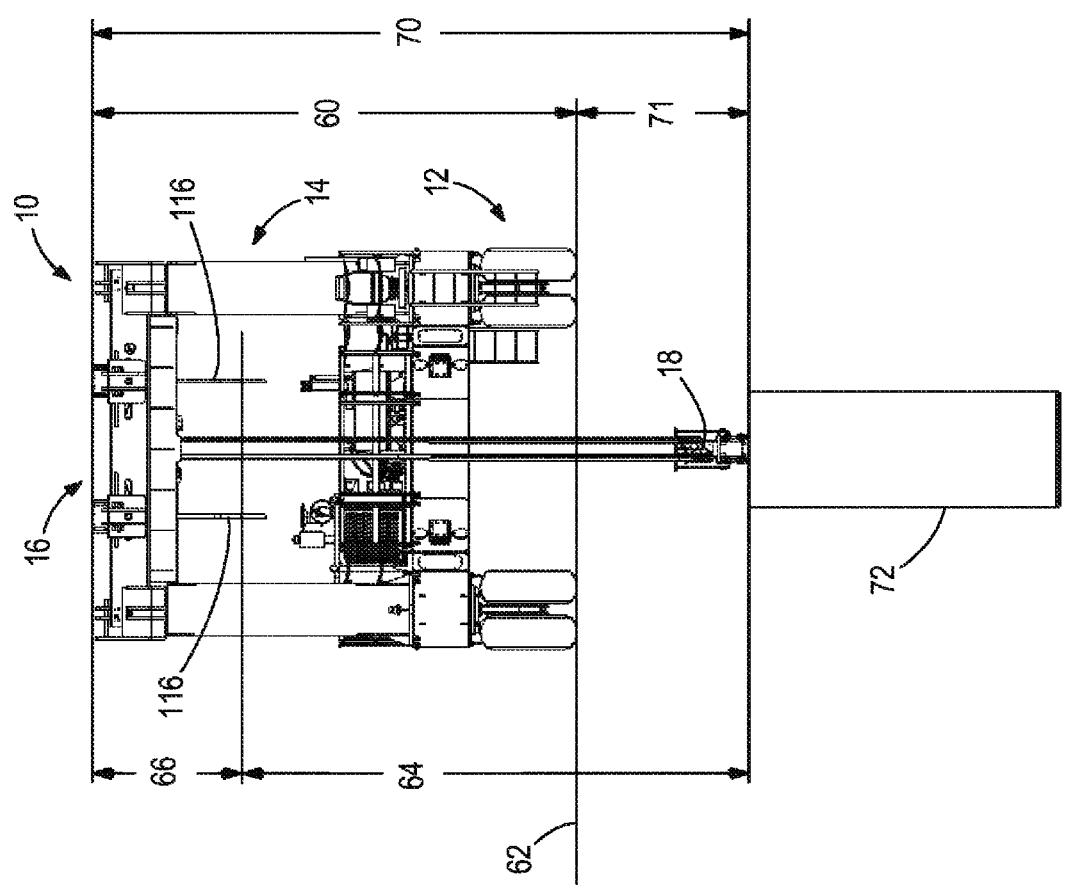
FIG. 5 is a front view of the cask transport assembly with the bottom block assembly in a second, deployed position.

FIGS. 4 and 5 illustrate a range of travel 64 of the bottom block assembly 18 with respect to the upper beam assembly 16, as well as with respect to a ground surface 62. In FIG. 4, the bottom block assembly 18 is positioned a first distance 66 from the upper beam 16. The bottom block assembly 18 is also positioned a first distance 68 from the support surface 62. In FIG. 4, the tower 14 is fully extended and the bottom block assembly 18 is fully retracted, so that the bottom block assembly 18 is as far above the support surface 62 as possible.

In FIG. 5, the bottom block assembly 18 is positioned a second distance 70 from the upper beam assembly 16. The bottom block assembly 18 is also positioned a second distance 71 from the support surface 62. In the illustrated construction, the bottom block assembly 18 is below the support surface 62, and is coupled to a multi-purpose canister 72. In FIG. 5, the tower 14 is fully retracted and the bottom block assembly 18 is fully extended, so that the bottom block assembly 18 is as far below the ground surface 62 as possible.

In some constructions, the range of travel 64 of the bottom block assembly 18 with respect to the upper beam assembly 16 is between about 8 feet and about 42 feet. In some constructions, the range of travel 64 is between about 17 feet and about 33 feet. In some constructions, the range of travel 64 is between about 21 feet and about 29 feet.

In the illustrated construction, the tower 14 travels between the first height 58 and the second height 60 and independently, the bottom block assembly 18 moves with respect to the upper beam assembly 16 over the range of travel 64. These travel ranges can be added to create an even greater range of motion for the bottom block assembly 18 with respect to the ground, as shown in FIGS. 4 and 5.

Figure 6:
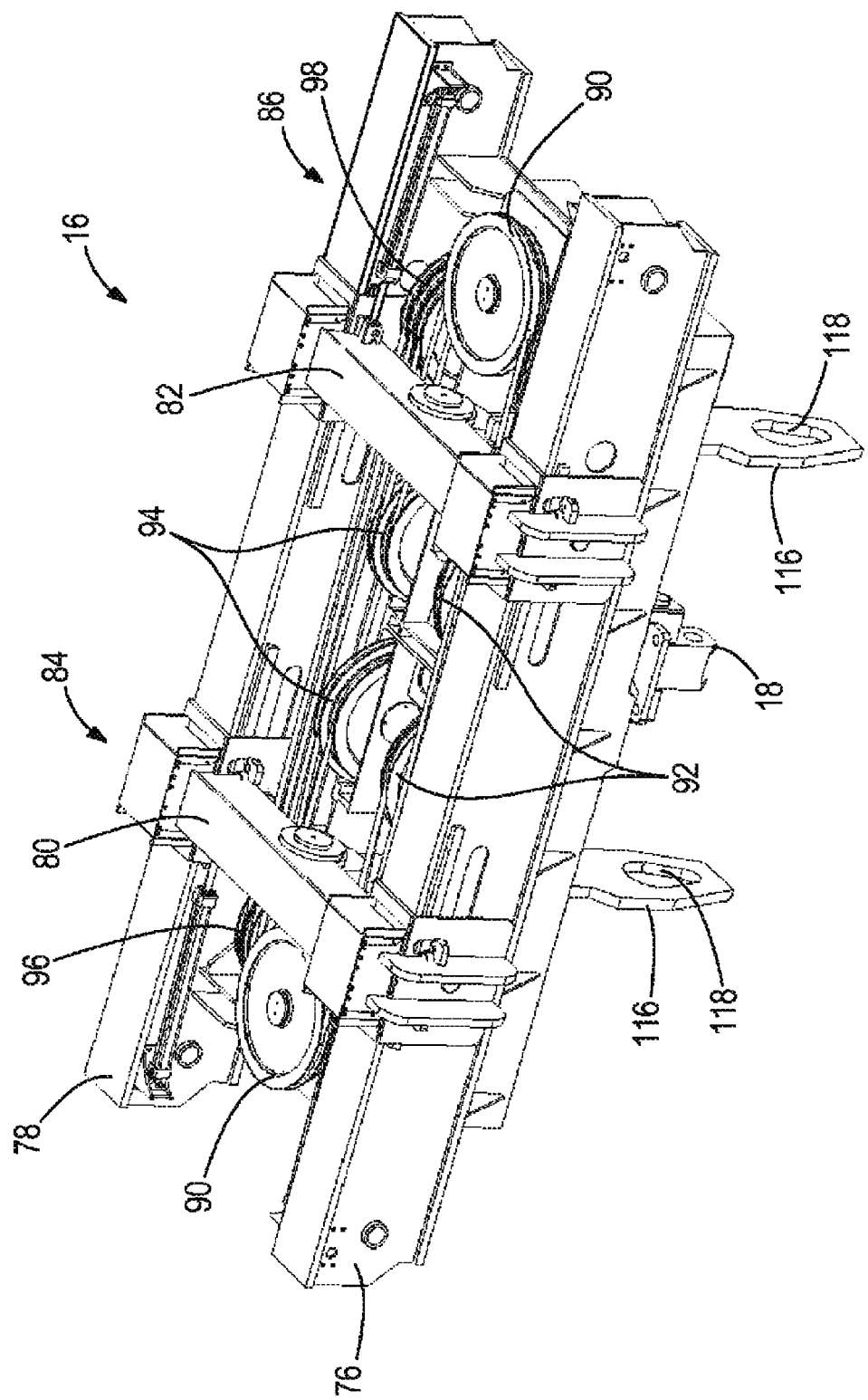
FIG. 6 is a perspective view of a lift beam assembly with the bottom block assembly in the first, stowed position.
Figure 7:
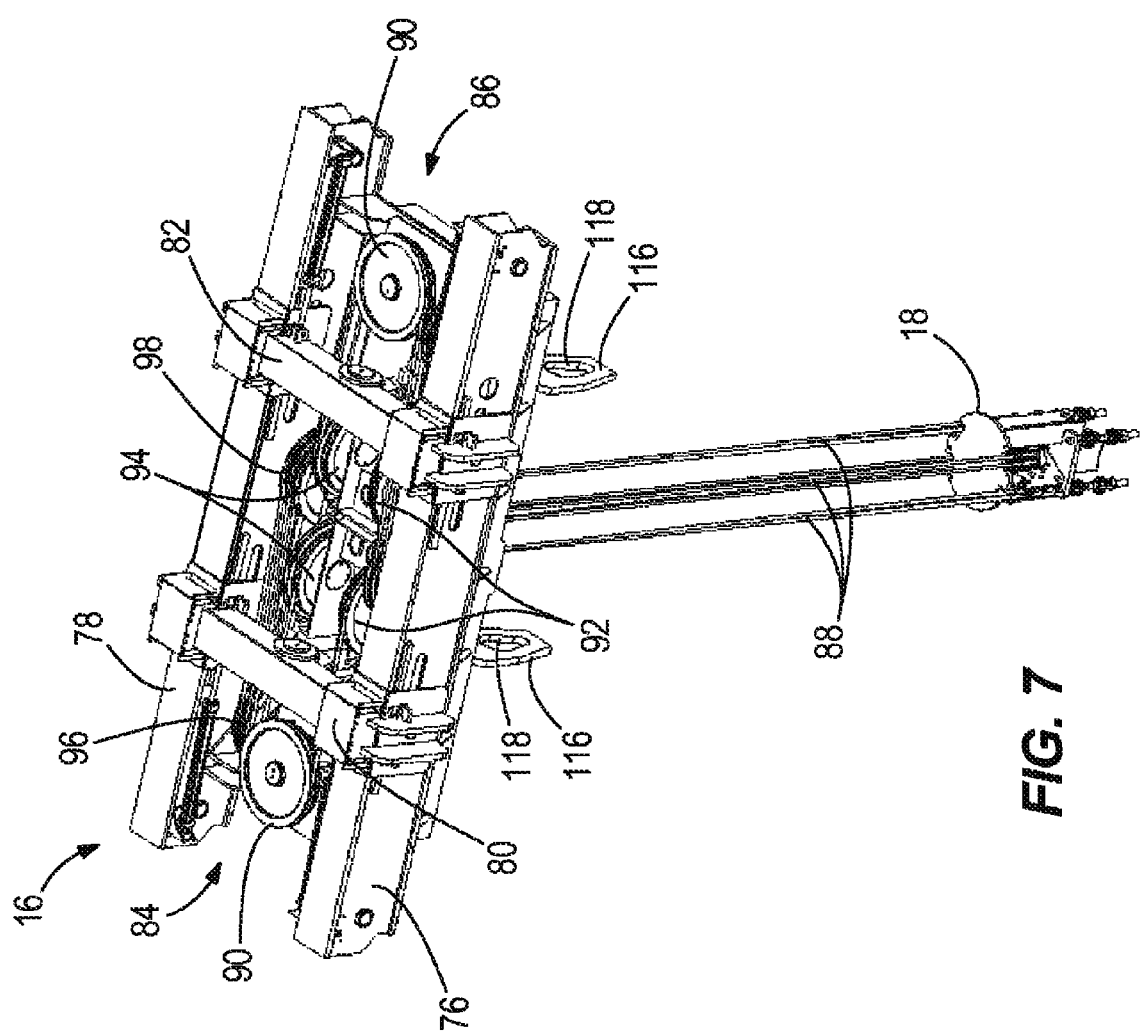
FIG. 7 is a perspective view of the lift beam assembly with the bottom block assembly in the second, deployed position.
Figure 8:
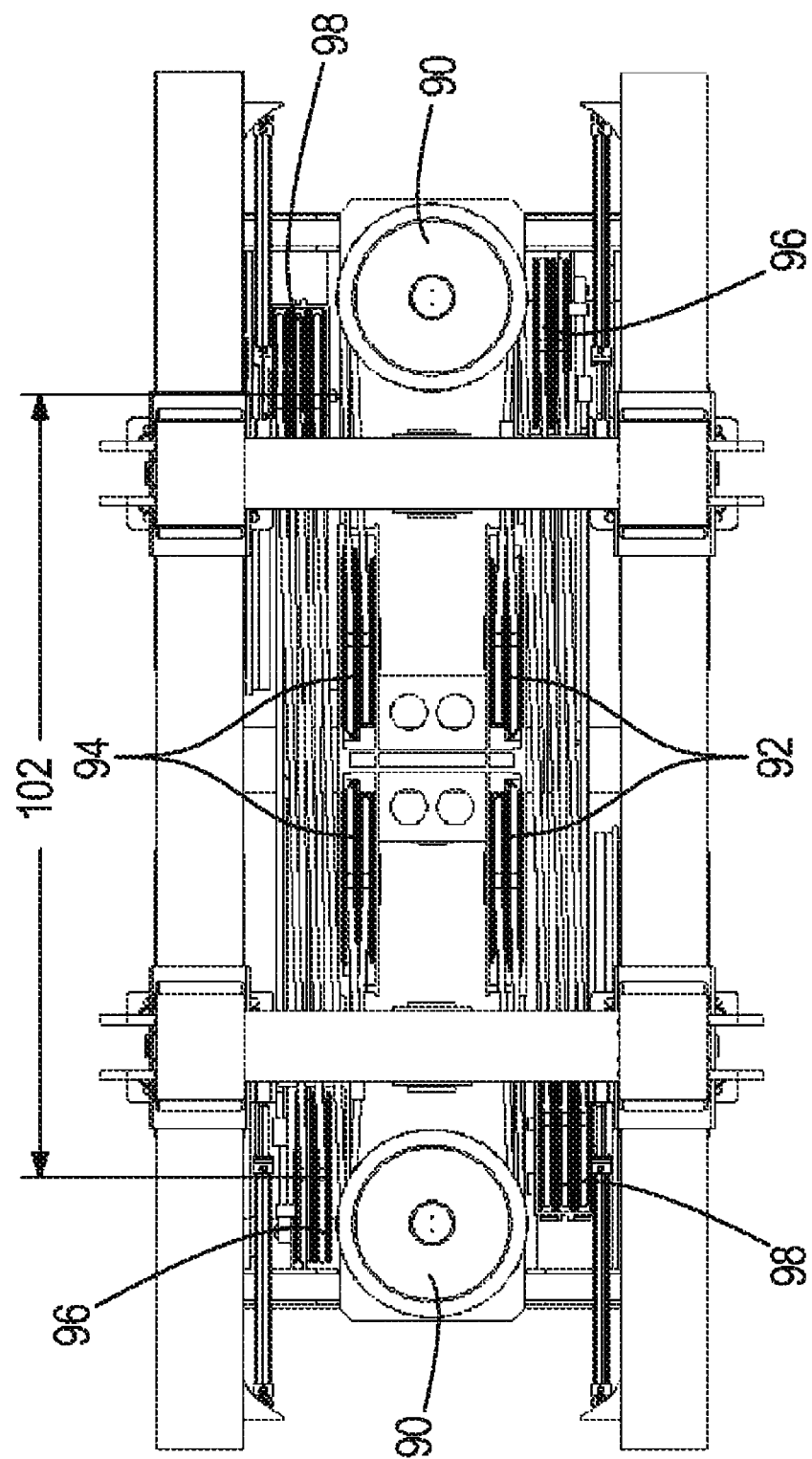
FIG. 8 is a top view of the lift beam assembly with the bottom block assembly in the first, stowed position.

Turning now to FIGS. 6 and 7, the bottom block assembly 18 is shown in the retracted position (FIG. 6) and the extended position (FIG. 7) with respect to the upper beam assembly 16. The upper beam 16 includes a pair of frame bars 76, 78, a pair of cross bars 80, 82, a pair of pulley systems 84, 86, and wires 88. The frame bars 76, 78 and the cross bars 80, 82 support the pulley systems 84, 86. The pulley systems 84, 86 are substantially mirror-images, so only the pulley system 84 will be discussed in detail; however, the discussion of pulley system 84 applies equally to pulley system 86.

Figure 9:
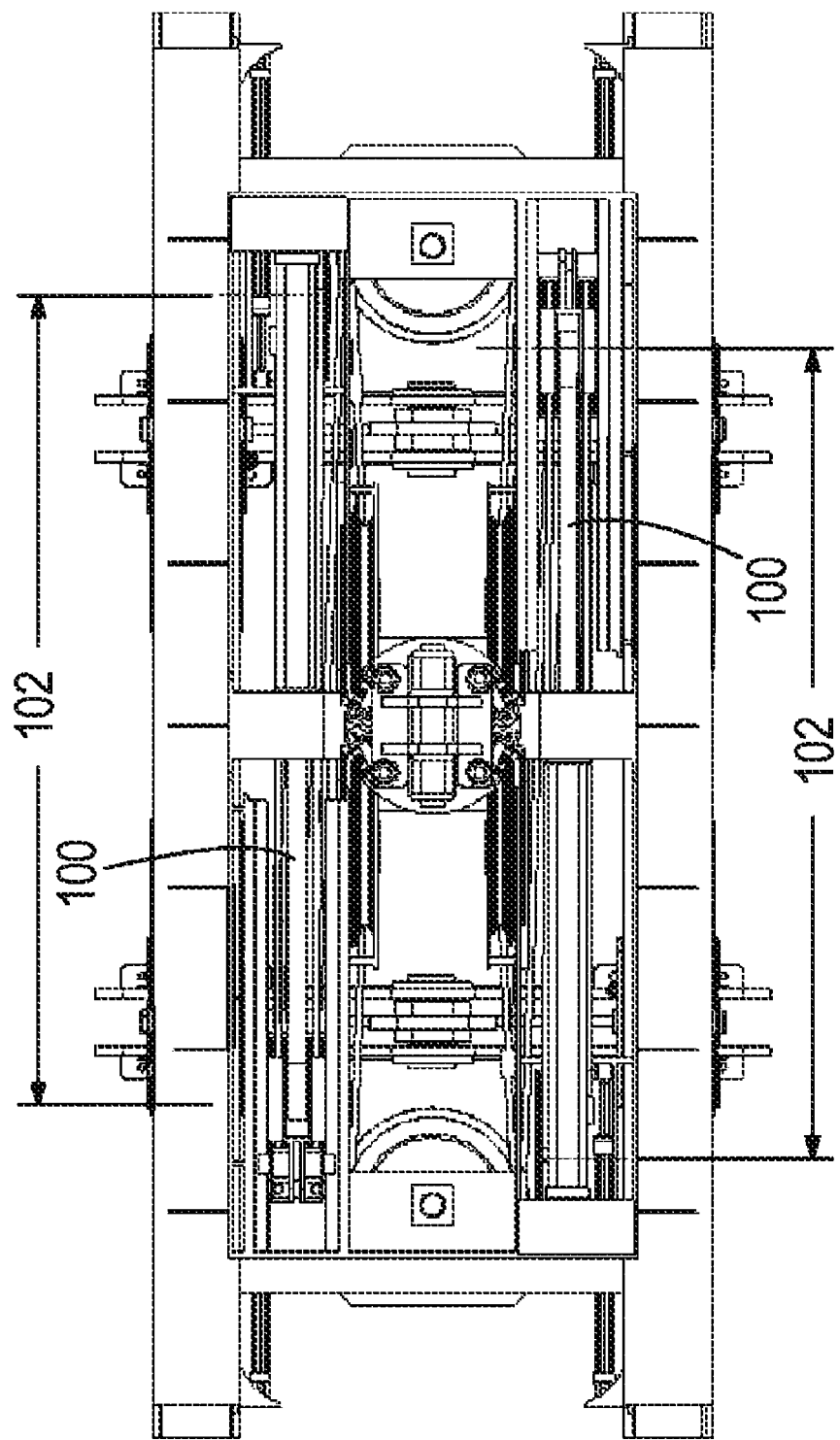
FIG. 9 is a bottom view of the lift beam assembly with the bottom block assembly in the first, stowed position.
Figure 10:
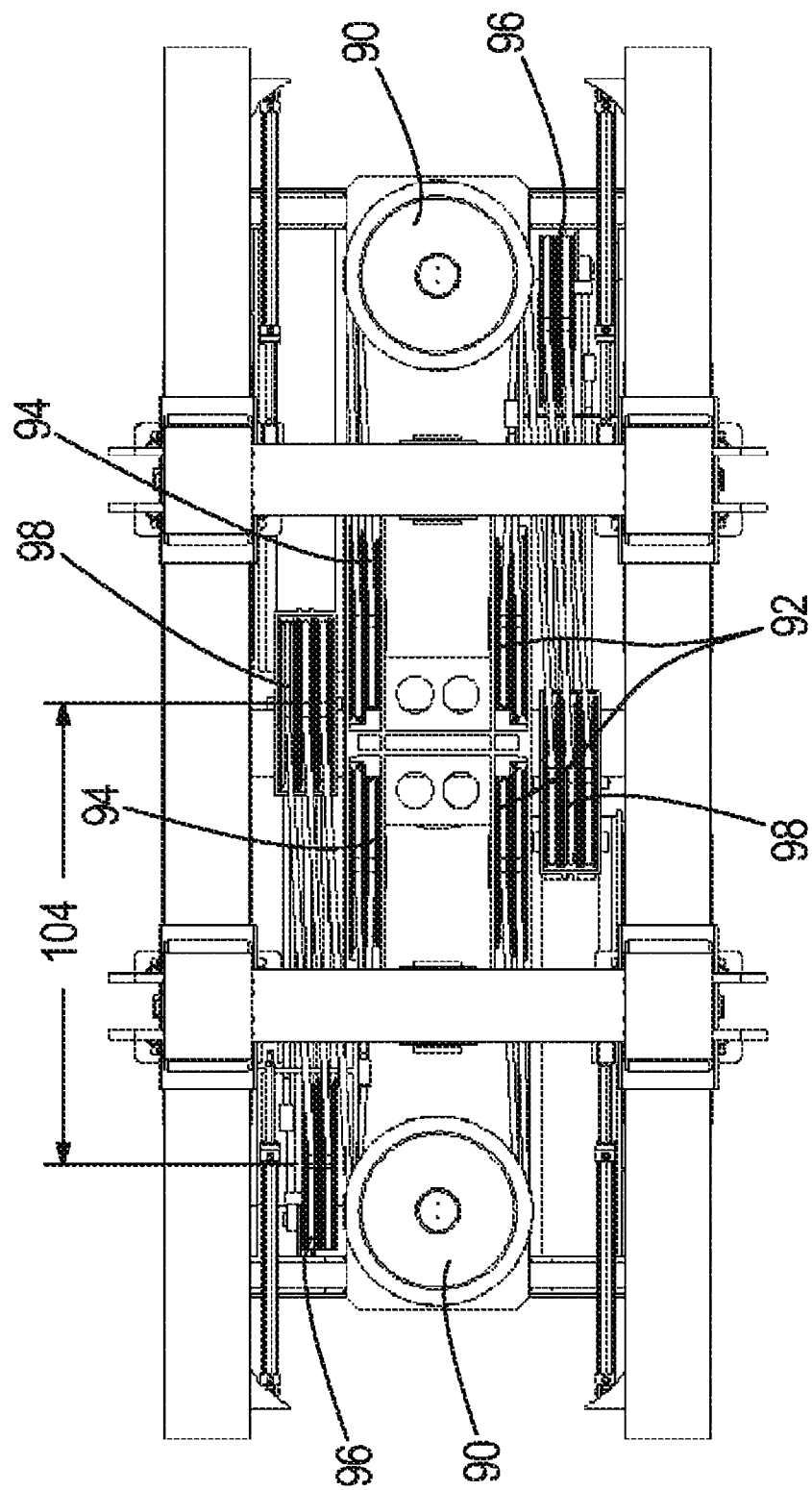
FIG. 10 is a top view of the lift beam assembly with the bottom block assembly in the second, deployed position.
Figure 11:
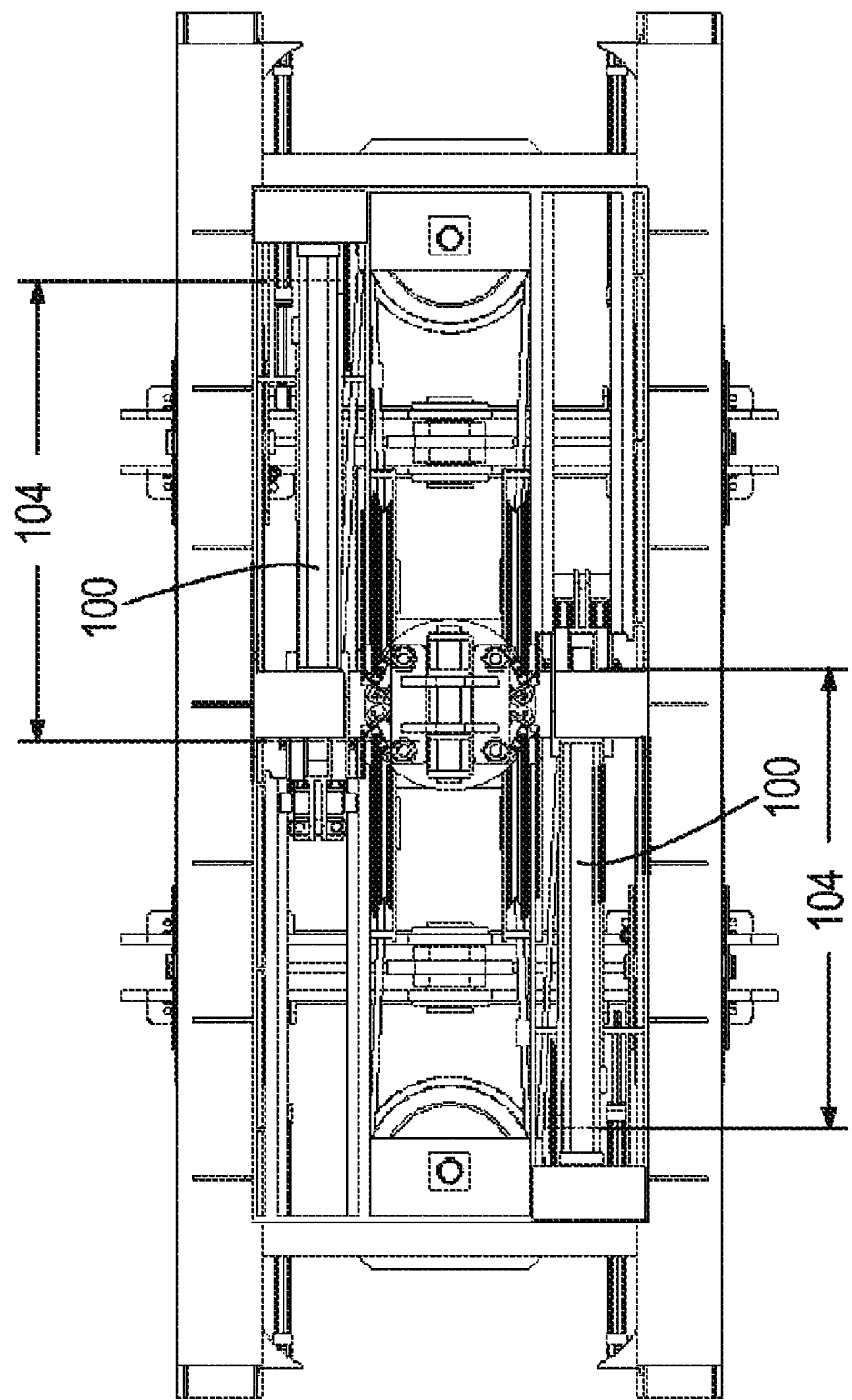
FIG. 11 is a bottom view of the lift beam assembly with the bottom block assembly in the second, deployed position.

With reference to FIGS. 6-11, the pulley system 84 includes a horizontal (i.e., oriented horizontally relative to the frame 22) sheave 90, a pair of stationary vertical (i.e., oriented vertically relative to the frame 22) sheaves 92, 94, a fixed sheave 96, an adjustable sheave 98, and hydraulic cylinders 100. The sheave 90 and the sheaves 92, 94 are fixed with respect to the upper beam 16. The fixed sheave 96 is fixed with respect to the upper beam 16, whereas the adjustable sheave 98 is moveable with respect to the upper beam 16. The hydraulic cylinders 100 move the second sheave 98 with respect to the upper beam 16 (FIGS. 9 and 11). The hydraulic cylinders 100 extend substantially horizontally and the adjustable sheave 98 moves substantially horizontally. Therefore, the height of the pulley system 84 and thus, the upper beam 16 is minimized.

The adjustable sheave 98 is positioned a first distance 102 (FIGS. 8 and 9) from the fixed sheave 96 when the bottom block assembly 18 is retracted. The adjustable sheave 98 is positioned a second distance 104 (FIGS. 10 and 11) from the fixed sheave 96 when the bottom block assembly 18 is extended. The difference between the first distance 102 and the second distance 104 defines a range of motion of the adjustable sheave 98 with respect to the fixed sheave 96. In some constructions, the range of motion is between about 1 foot and about 8 feet. In some constructions, the range of motion is between about 2 feet and about 6 feet. In some constructions, the range of motion is between about 3 feet and about 5 feet.

The wires 88 extend around the various sheaves in the upper beam 16 and are connected to the bottom block assembly 18. When the hydraulic cylinders 100 move the adjustable sheave 98, the wires 88 are either drawn up into the upper beam 16 (FIGS. 6, 8, 9) or are deployed from the upper beam 16 (FIGS. 7, 10, 11). Therefore, by moving the adjustable sheave 98, the bottom block assembly 18 is moved between the retracted and extended positions.

Figure 13:
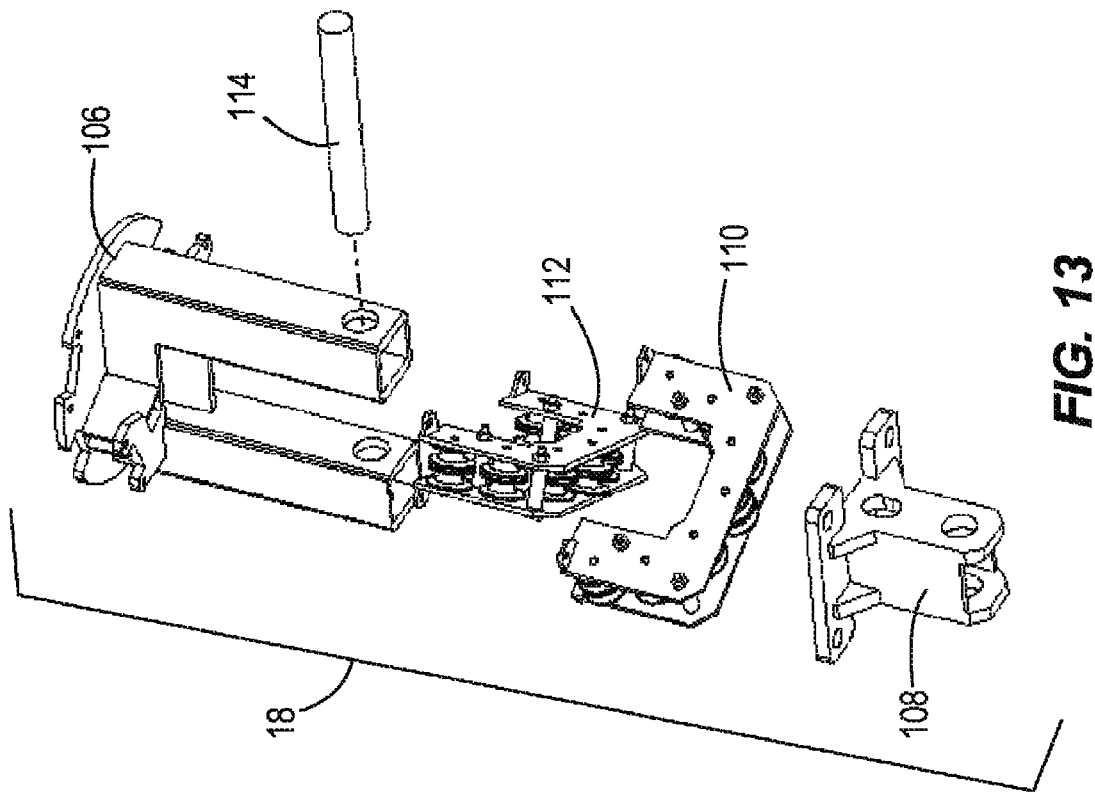
FIG. 13 is an exploded view of the bottom block assembly.
Figure 12:
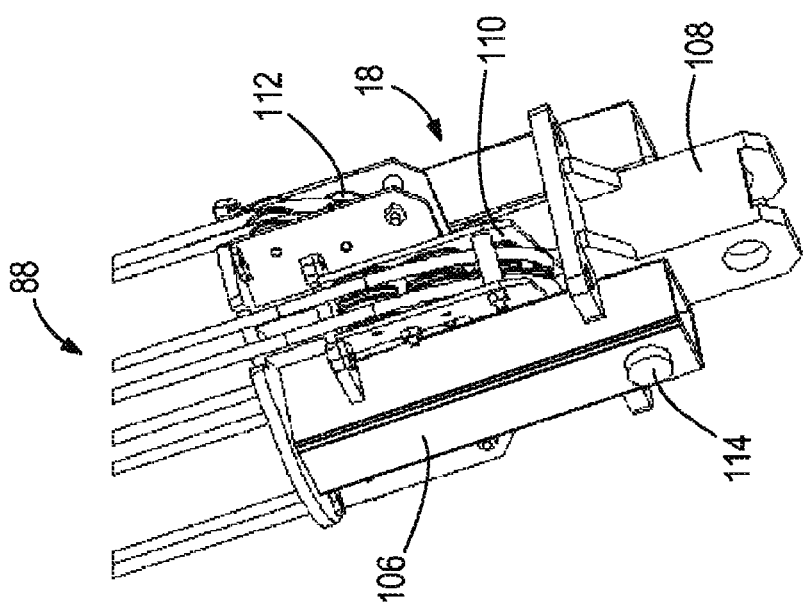
FIG. 12 is a perspective view of the bottom block assembly showing wire ropes extending through roller guides.

Turning now to FIGS. 12 and 13, the bottom block assembly 18 includes a bottom block 106, a lift block 108, a first roller guide 110, a second roller guide 112 and a pin 114. The pin 114 connects the bottom block 106 and the lift block 108 and retains the first and second roller guides 110, 112 between the bottom block 106 and the lift block 108. The roller guides 110, 112 each include multiple rollers that guide the wires 88 around the bottom block assembly 18. The lift block 108 includes slots that permit over-travel to thereby allow removal of secondary lifting devices, such as slings or chains, after a load is connected to the bottom block assembly 18.

The bottom block assembly 18 is reeved to be single failure proof per ASME NOG-1-2004. The second roller guide 112 is installed perpendicular to the centerline of a path of at least one of the wires 88. The first and second roller guides 110, 112 permit the bottom block assembly 18 to have a small outside diameter in which the wires 88 cross below the bottom block assembly 18. The outside diameter of the illustrated bottom block assembly 18 is about 26 inches. This permits the bottom block assembly 18 to be inserted into small openings. The rollers in the roller guides 110, 112 can be arranged as a half circle in which the outer diameter of each roller is tangent to the arc corresponding to the minimum bend radius of the specified wire rope utilized.

With continued reference to FIGS. 1 and 4-7, the upper beam assembly 16 further includes support arms 116. The support arms 116 are rigid structures extending vertically beneath the upper beam assembly 16, and are used to releasably couple to devices that are being transported (e.g., a cask storage container). Two support arms 116 are illustrated, though in other constructions different numbers or arrangements of support arms 116 are used. Each of the support arms 116 includes a coupling component 118 (FIGS. 6 and 7), for example in the form of an opening, that is used to releasably couple the support arm 116 to a device to be transported.

Figure 14:
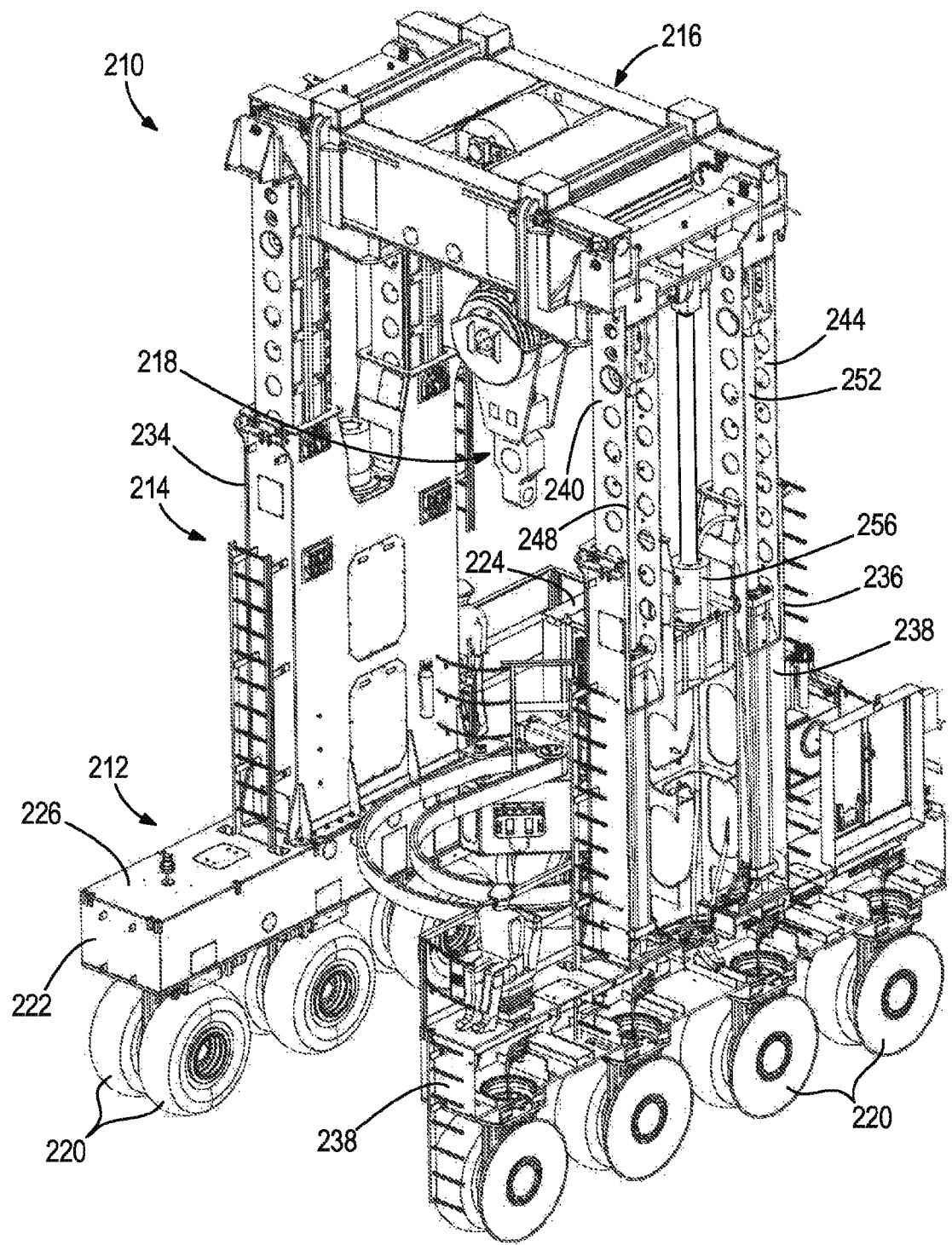
FIG. 14 is a perspective view of a cask transport assembly according to another construction of the invention, with a portion of the assembly system shown in cross section, and hydraulic cylinders shown in a fully extended position.
Figure 15:
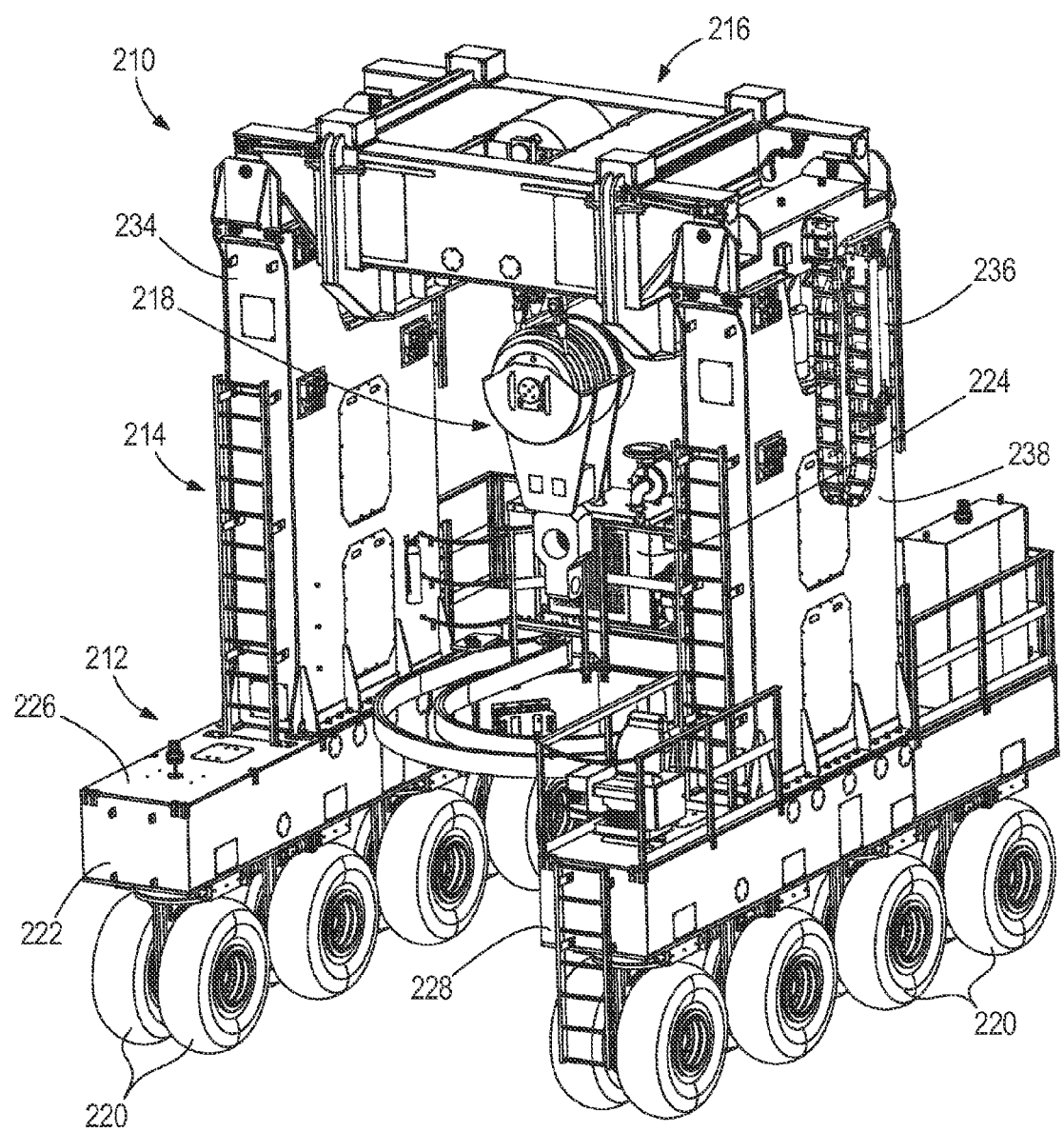
FIG. 15 is a perspective view of the cask transport assembly of FIG. 14, with the hydraulic cylinders in a fully retracted positioned.

With reference to FIGS. 14 and 15, another construction of a cask transport assembly 210 is illustrated. The cask transport assembly 210 is similar to the cask transport assembly 10 above. For example, the cask transport assembly 210 generally includes a support assembly 212, a tower 214, an upper beam assembly 216, and a bottom block assembly 218. The support assembly 212 includes wheels 220 (e.g., sixteen in the illustrated construction), a U-shaped frame 222 and a prime mover 224. The U-shaped frame 222 includes first and second legs 226, 228 and a middle portion 230. Each of the legs 226, 228 is supported on eight of the wheels 220. The prime mover 224 is supported on the middle portion 230. The prime mover 224 is part of a hydraulic system that is operable to drive the wheels 220 and thereby move the U-shaped frame 222, as well as actuate the various hydraulic cylinders described herein.

As shown in FIG. 14, the tower 214 includes a first side 234 and a second side 236 which is substantially a mirror-image of the first side 234. The first side 234 is coupled to the first leg 226, while the second side 236 is coupled to the second leg 228. Because the first side 234 is a substantial mirror-image of the second side 236, only the second side 236 will be discussed in detail; however, the discussion of the second side 236 applies equally to the first side 234. A portion of the second side 236 is shown in cross section.

The second side 236 includes a base portion 238, a single pair of moving frames 240, 244, and a single pair of hydraulic cylinders 248, 252. The second side 236 also includes a safety catch 256. The base portion 238 is substantially fixed to the second side 236 of the frame 222 and extends upwardly therefrom. The base portion 238 is a substantially hollow rectangular frame.

The pair of moving frames 240, 244 are coupled to the base portion 238 and telescope vertically in and out of the substantially hollow rectangular frame defined by the base portion 238. The moving frames 240, 244 are substantially hollow rectangular frames. The hydraulic cylinders 248, 252 are coupled to the base portion 238 at one end and to a respective one of the pair of moving frames 240, 244 at the other end. The pair of hydraulic cylinders 248, 252 are heavy duty double-acting hydraulic cylinders and are operable to move the pair of moving frames 240, 244 vertically both up and down. FIG. 14 shows the pair of hydraulic cylinders 248, 252 in a fully extended position, whereas FIG. 15 shows the pair of hydraulic cylinders 248, 252 in a fully retracted position.

The safety catch 256 is included to catch the upper beam assembly 16 in the event of hydraulic pressure loss.

Similar to the cask transport assembly 10, the cask transport assembly 210 is adjustable vertically so that the upper beam assembly 216 may be raised as high as between about 17 feet and about 58 feet above a support surface (e.g., support surface 62 in FIG. 2). In some constructions, the upper beam assembly 216 may be raised to as high as between about 25 feet and about 50 feet above the support surface. In some constructions, the upper beam assembly 216 may be raised as high as between about 33 feet and about 42 feet above the support surface.

The upper beam assembly 216 may be lowered to as low as between about 4 feet and about 42 feet above the support surface. In some constructions, the upper beam assembly 216 may be lowered to as low as between about 12 feet and about 33 feet above the support surface. In some constructions, the upper beam assembly 216 may be lowered to as low as between about 21 feet and about 25 feet above the support surface.

Figure 17:
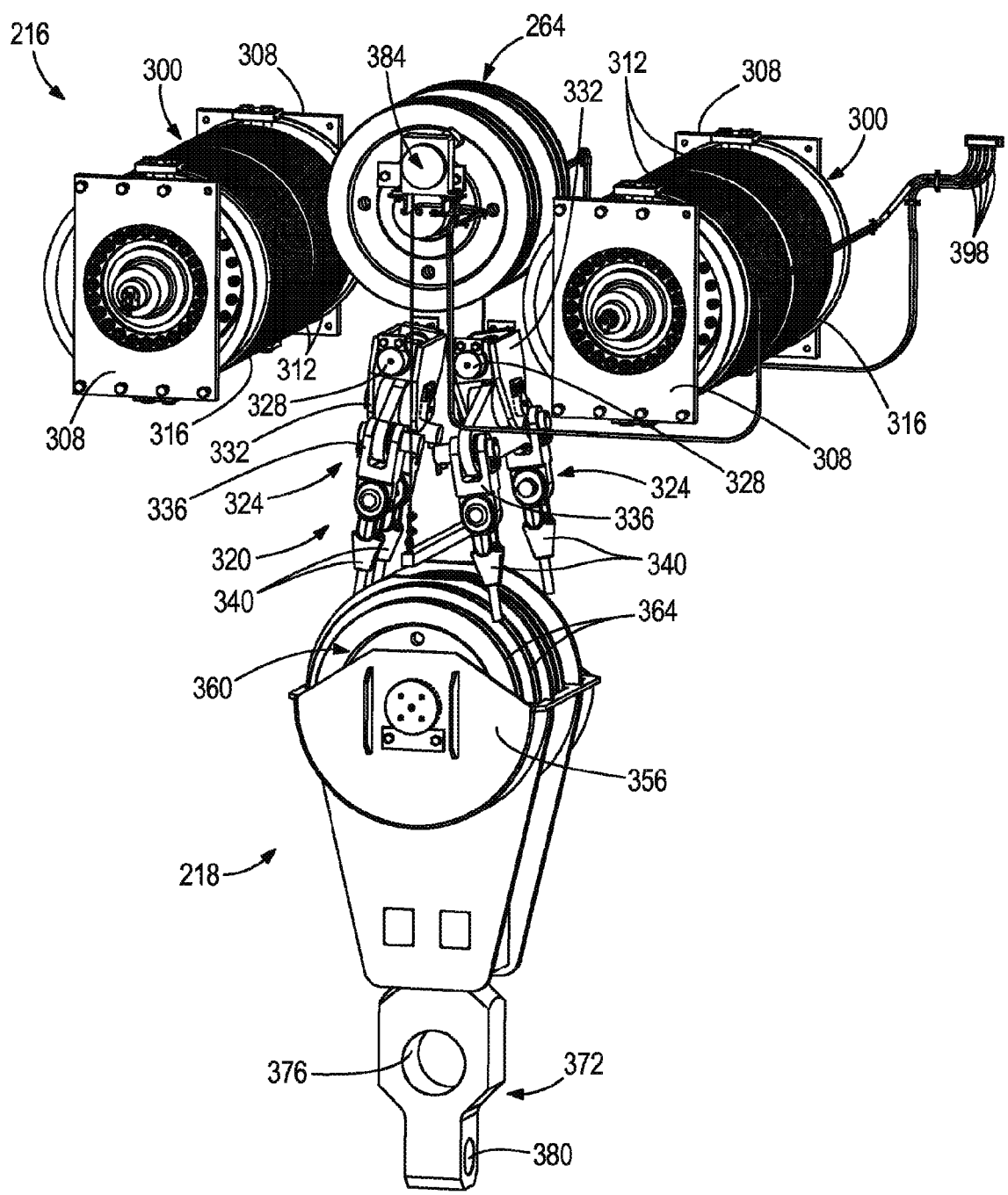
FIG. 17 is a front perspective view of inner components of the upper beam assembly and bottom block assembly of FIG. 16.
Figure 18:
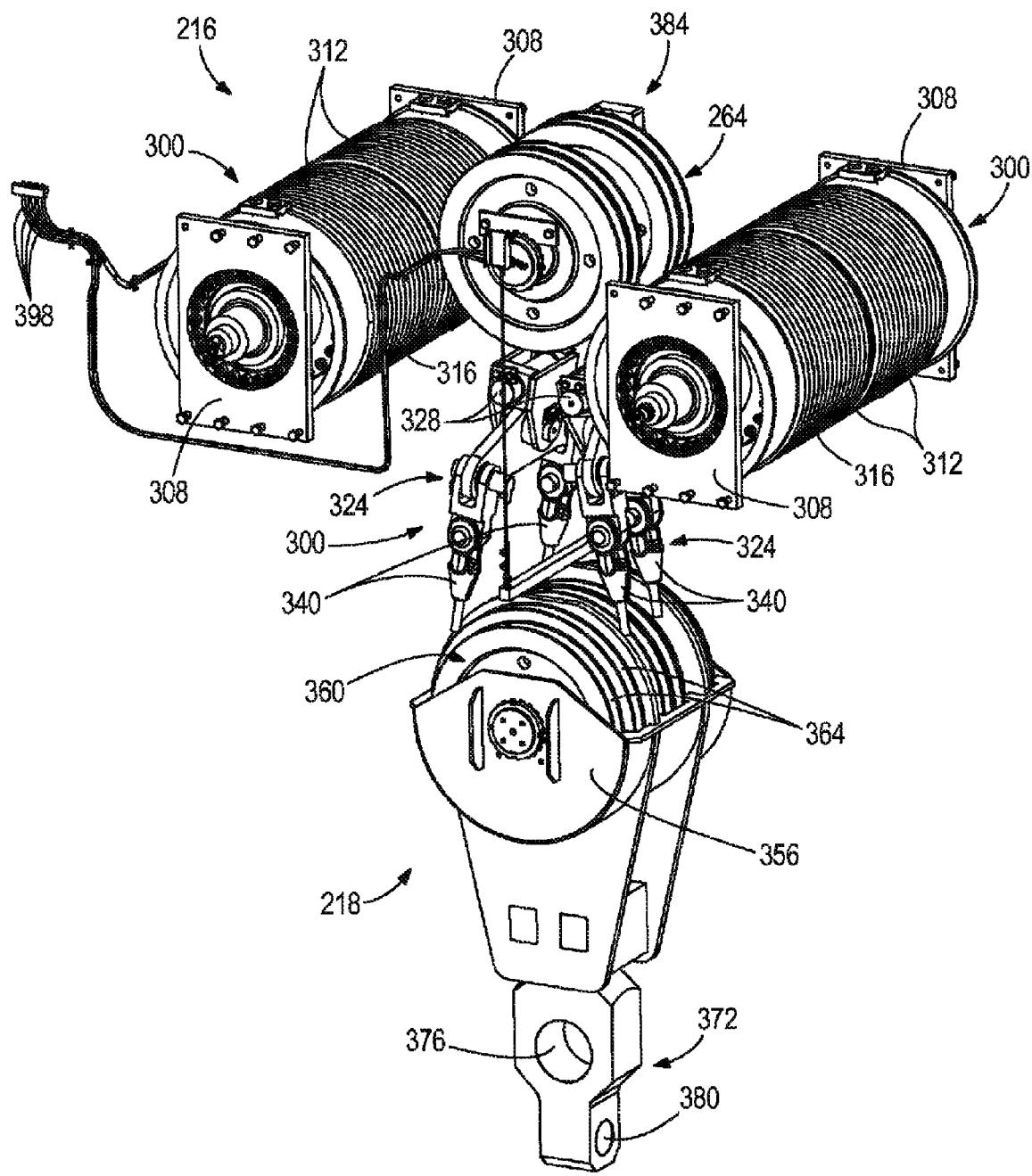
FIG. 18 is a back perspective view of the inner components of the upper beam assembly and bottom block assembly of FIG. 16.
Figure 19:
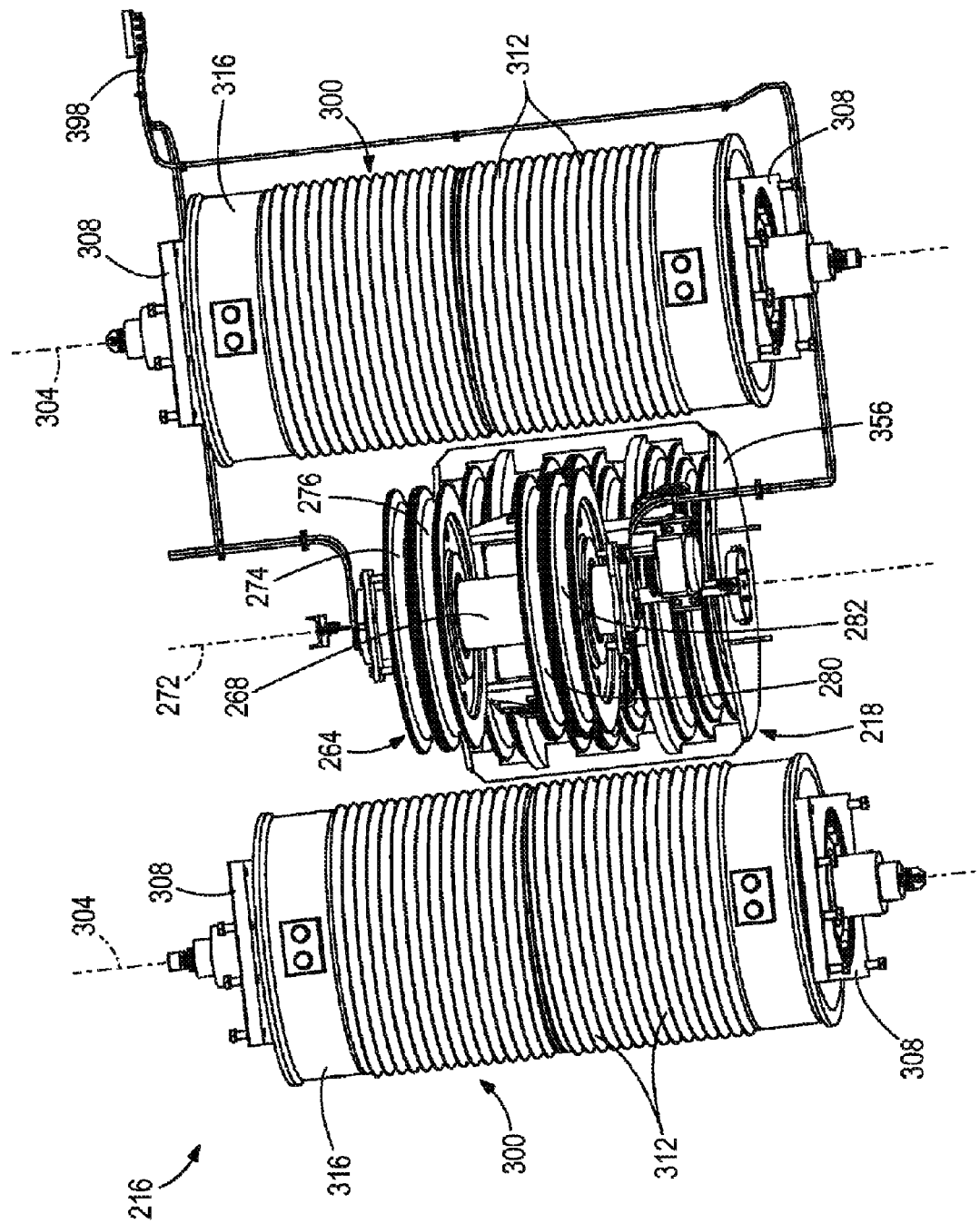
FIG. 19 is a top perspective view of the inner components of the upper beam assembly and bottom block assembly of FIG. 16.
Figure 21:
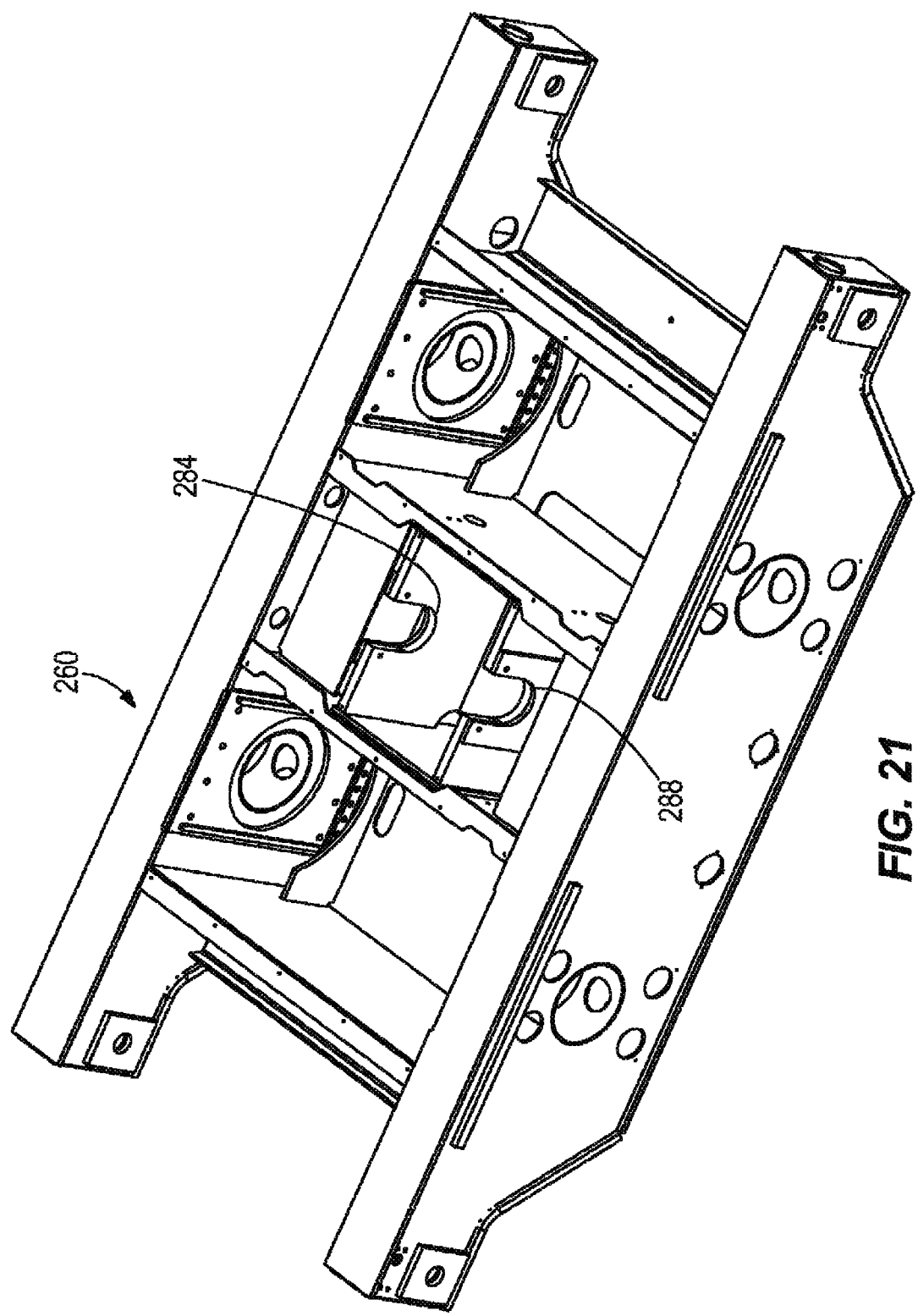
FIG. 21 is a top perspective view of a frame of the upper beam assembly of FIG. 16.

With reference to FIGS. 16-19, the upper beam assembly 216 includes a frame 260 that houses an upper sheave 264. As illustrated in FIG. 19, the sheave 264 includes a central elongate sheave pin 268 defining an axis 272. The sheave 264 includes two grooved portions 274, 276 located adjacent one another at one end of the pin 268 and two other grooved portions 280, 282 located adjacent one another at an opposite end of the pin 268. With reference to FIG. 21, the pin 268 sits within two notched regions 284, 288 along a top of the frame 260.

Figure 25:
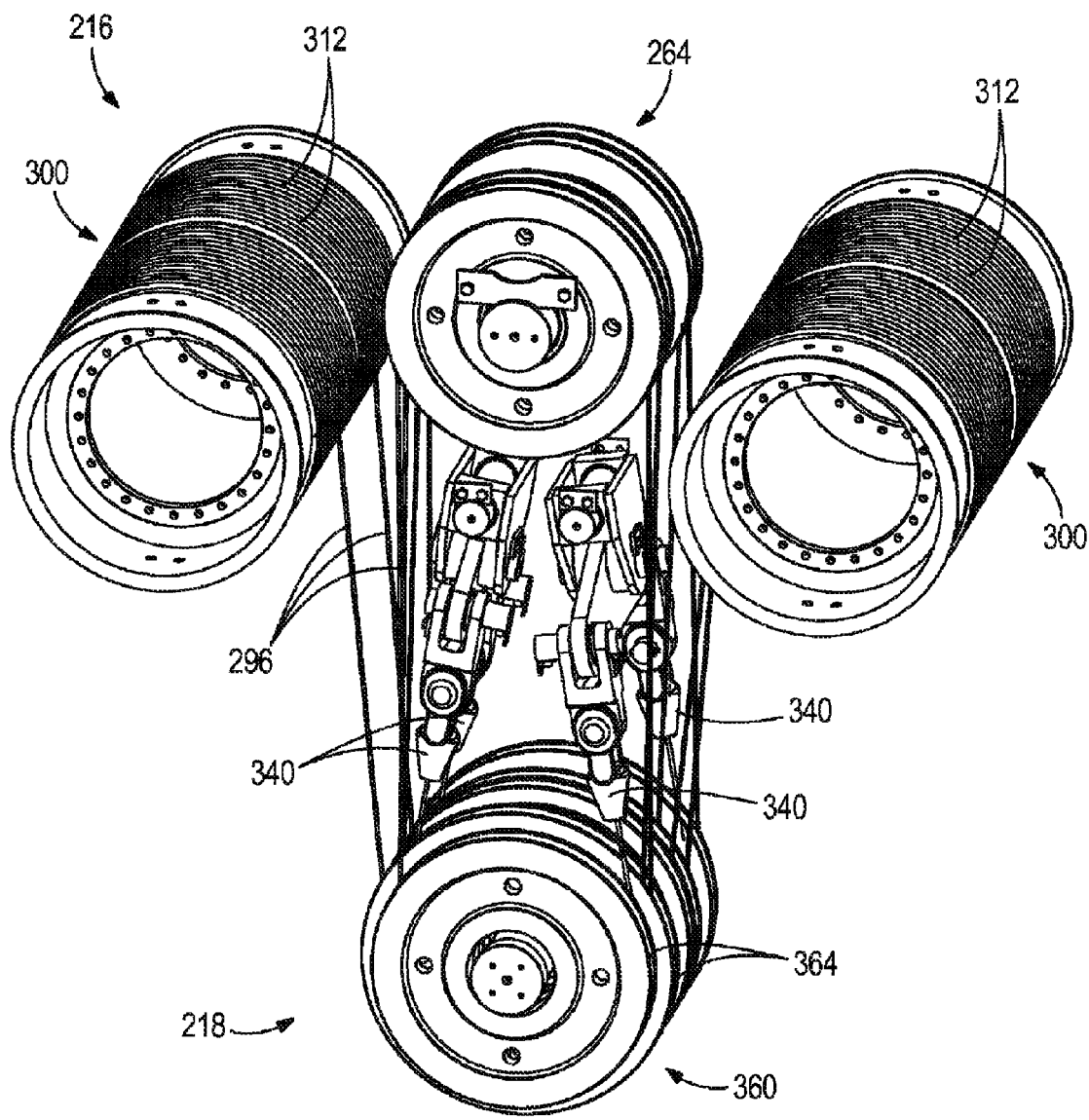
FIG. 25 is a perspective view of rope reeving utilizing components of the upper beam assembly and bottom block assembly of FIG. 16, the bottom block assembly being in a retracted position.
Figure 26:
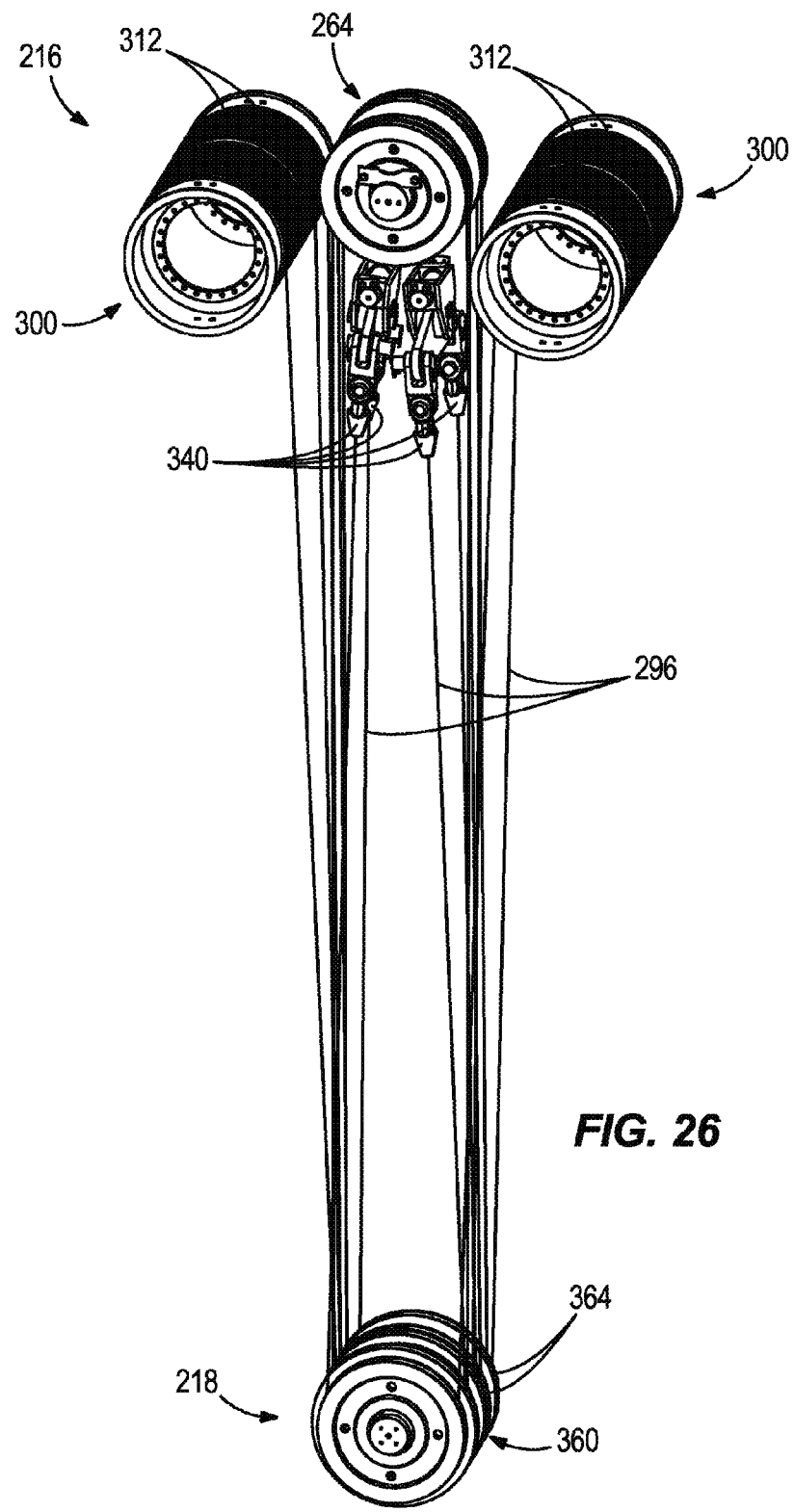
FIG. 26 is a perspective view of rope reeving utilizing components of the upper beam assembly and bottom block assembly of FIG. 16, the bottom block assembly being in an extended position.

As illustrated in FIGS. 25 and 26, the sheave 264 is generally centrally located within the upper beam assembly 216. Each of the four grooved portions 274, 276, 280, and 282 receives a wire 296 (e.g., in the form of cable, rope, or any other flexible structure configured to be guided by the grooved portions 274, 276, 280, 282).

With reference to FIGS. 17-19, on either side of the sheave 264 is a winch drum 300. Two winch drums 300 are illustrated, though in other constructions different numbers of winch drums 300 are used. The winch drums 300 extend along axes 304 that are parallel to, and located below, the axis 272. Each of the winch drums 300 is driven by two planetary hydraulic gearbox motors 308. The gearbox motors 308 are located at opposite ends of the winch drums 300. The gearbox motors 308 each include a set of planetary gears that reduces the transmission of the motor and generates rotational movement of the winch drum 300 about the axis 304. The winch drums 300 further include grooved portions 312 disposed along outside surfaces 316 of the winch drums 300.

As illustrated in FIGS. 25 and 26, the grooved portions 312 receive the wires 296, and are used to help guide and wind the wires 296 about the winch drums 300 as the winch drums 300 are rotated about their respective axes 304.

Figure 24:
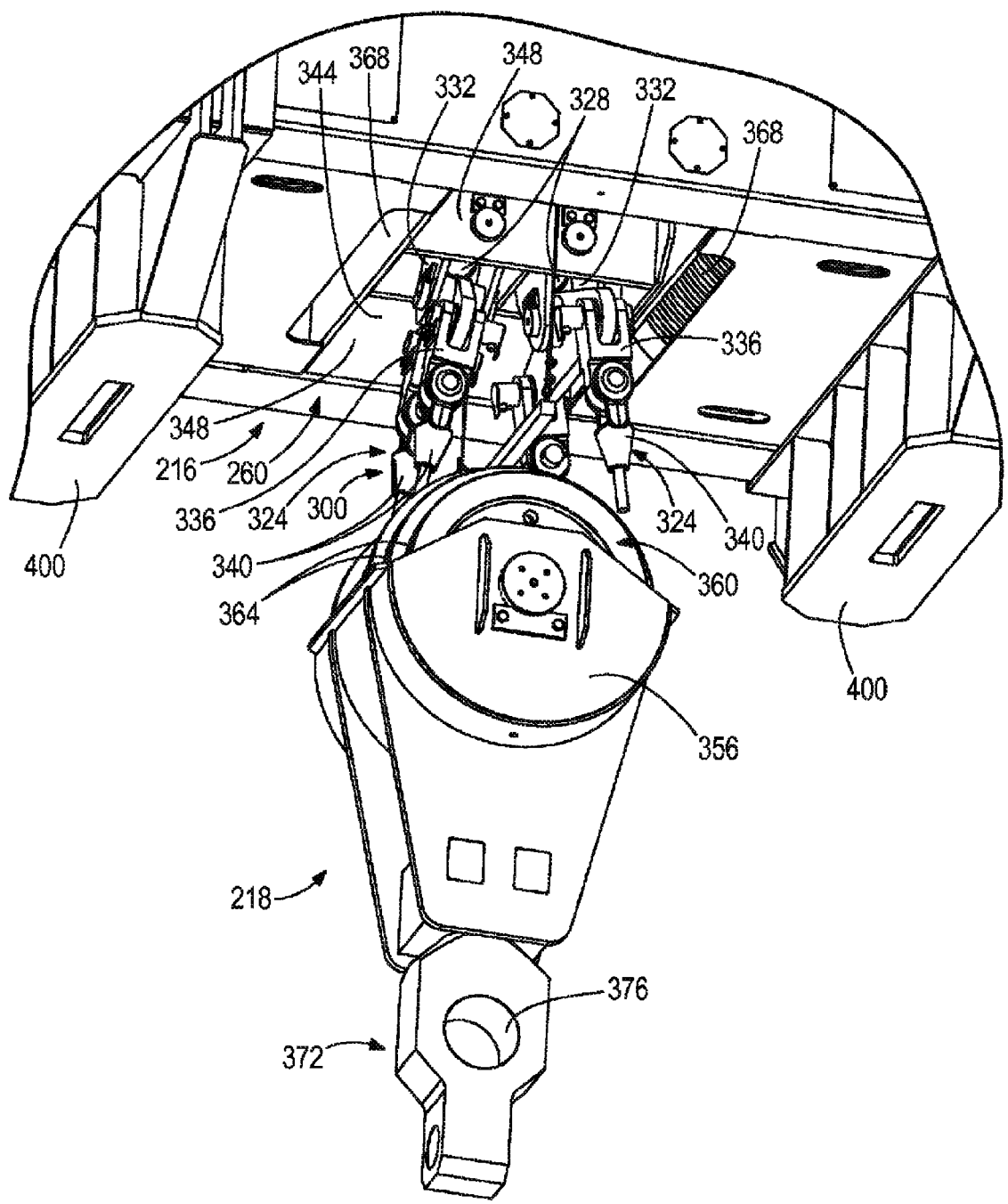
FIG. 24 is a partial, bottom perspective view of the upper beam assembly and bottom block assembly of FIG. 16.

With reference to FIGS. 17, 18, and 24, the upper beam assembly 216 further includes an equalizer 320. The equalizer 320 is used to help stabilize the overall system, and inhibit the bottom block assembly 218 from swaying. The equalizer 320 is located below the sheave 264. The equalizer 320 includes two dead end elements 324. Each of the dead end elements 324 includes a pin 328, a first linkage member 332 coupled to and disposed below the pin 328, a second linkage member 336 coupled to and disposed below the first linkage member 332, and a pair of third linkage members 340 coupled to and disposed below the second linkage member 336.

As illustrated in FIGS. 25 and 26, each of the third linkage members 340 is an anchor point, or dead end, for one of the wires 296.

Figure 22:
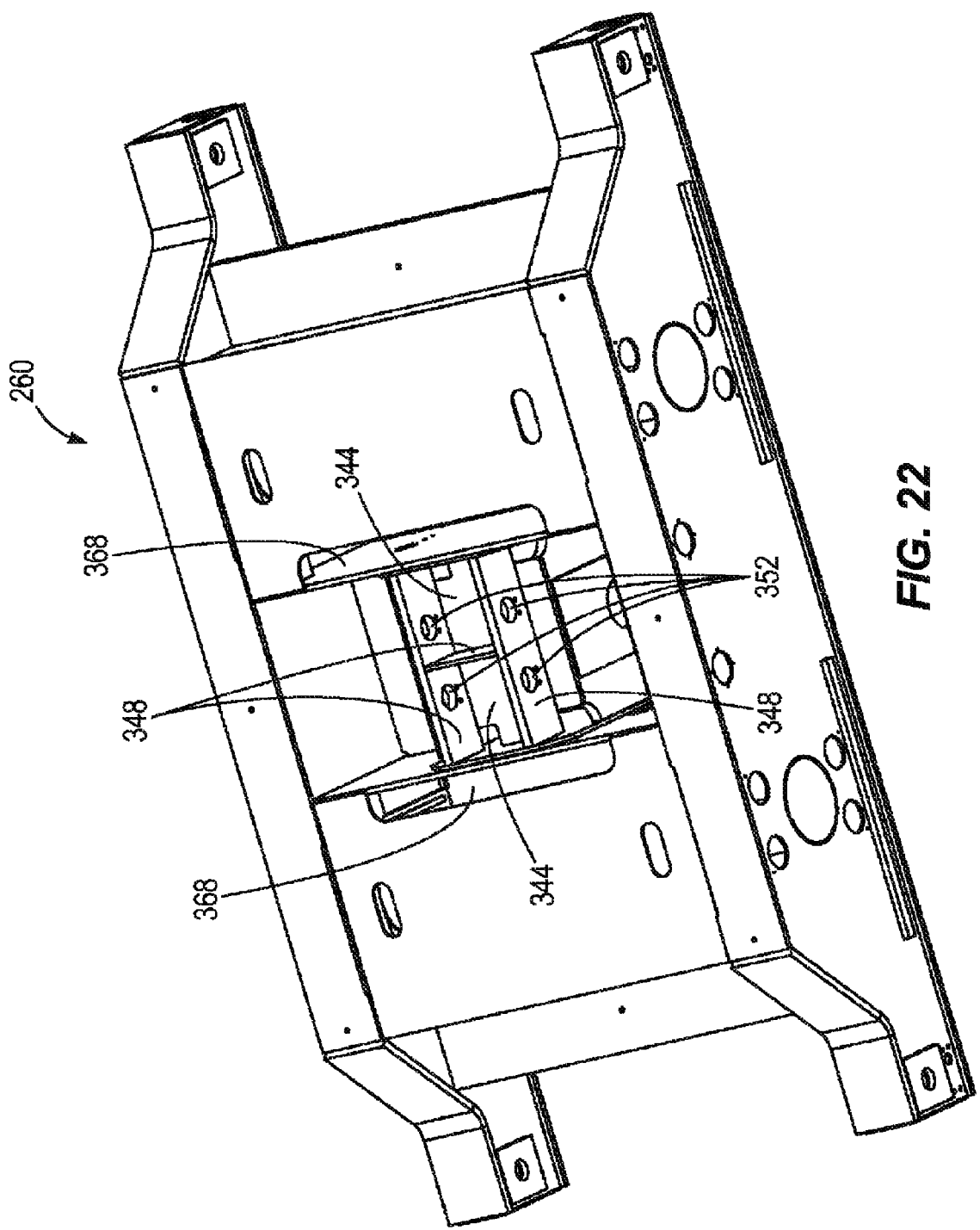
FIG. 22 is a bottom perspective view of the frame of the upper beam assembly of FIG. 16.

With reference to FIGS. 22 and 24, the equalizer 320 is coupled to the frame 260. Specifically, and with reference to FIG. 22, the frame 260 includes two recessed areas 344 along the bottom of the frame 260. The recessed areas 344 are bounded by three walls 348, which include four openings 352. As illustrated in FIG. 24, the two pins 328 sit within the recessed areas 344, with ends of the pins 328 extending through the openings 352, such that the equalizer 320 is coupled to the frame 260 directly below the sheave 264.

With reference to FIGS. 17-19 and 24, the bottom block assembly 218 is disposed below the equalizer 320. The bottom block assembly 218 is reeved to be single failure proof per ASME NOG-1-2004. The bottom block assembly 218 includes a housing 356, and a bottom sheave 360 partially disposed within the housing 356. The sheave 360 includes eight grooved portions 364, though in other constructions a different number of grooved portions are used.

As illustrated in FIGS. 25 and 26, the grooved portions 364 receive and guide the wires 296. The wires 296 are directed to wind about both the sheaves 264 and 360, and are fastened at one end to the third linkage members 340, and at another end to the winch drums 300.

Figure 23:
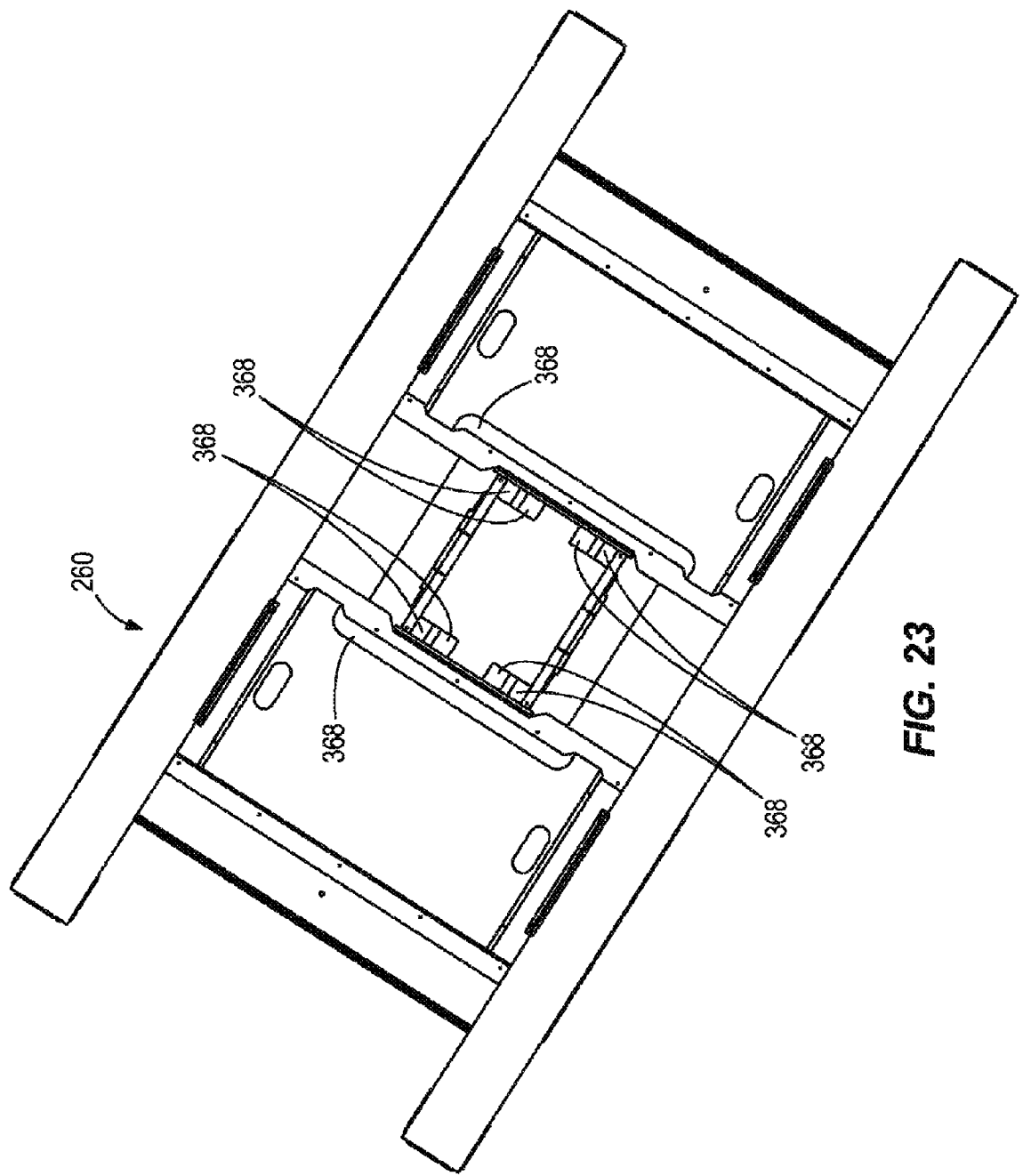
FIG. 23 is a top view of the frame of the upper beam assembly of FIG. 16.

With reference to FIGS. 22-24, the frame 260 further includes openings 368 that are used to help guide and provide access for the wires 296 between the sheave 264, the winch drums 300, and the sheave 360.

With reference to FIGS. 17, 18, and 24, a bottom block 372 is coupled to, and partially disposed below, the housing 356 and the sheave 360. The bottom block 372 includes a first opening 376 and a second opening 380. The first opening 376 is disposed above the second opening 380, and is oriented perpendicular to the second opening 380. The bottom block 372 is configured to couple with a device to be transported. For example, the first and second openings 376, 380 are configured to receive wires, ropes, pins, chains, or other coupling structures on a device such as a cask, such that the cask may be releasably attached to the bottom block 372. Other constructions of the bottom block 372 include different structures and/or openings for releasably coupling the bottom block 372 with a device to be transported.

Overall, the range of travel of the bottom block assembly 372 with respect to the upper beam assembly 216, through use of the wires 296, the sheave 264, the winch drums 300, and the sheave 360, is between about 8 feet and about 42 feet. In some constructions, the range of travel is between about 17 feet and about 33 feet. In some constructions, the range of travel is between about 21 feet and about 29 feet.

Figure 20:
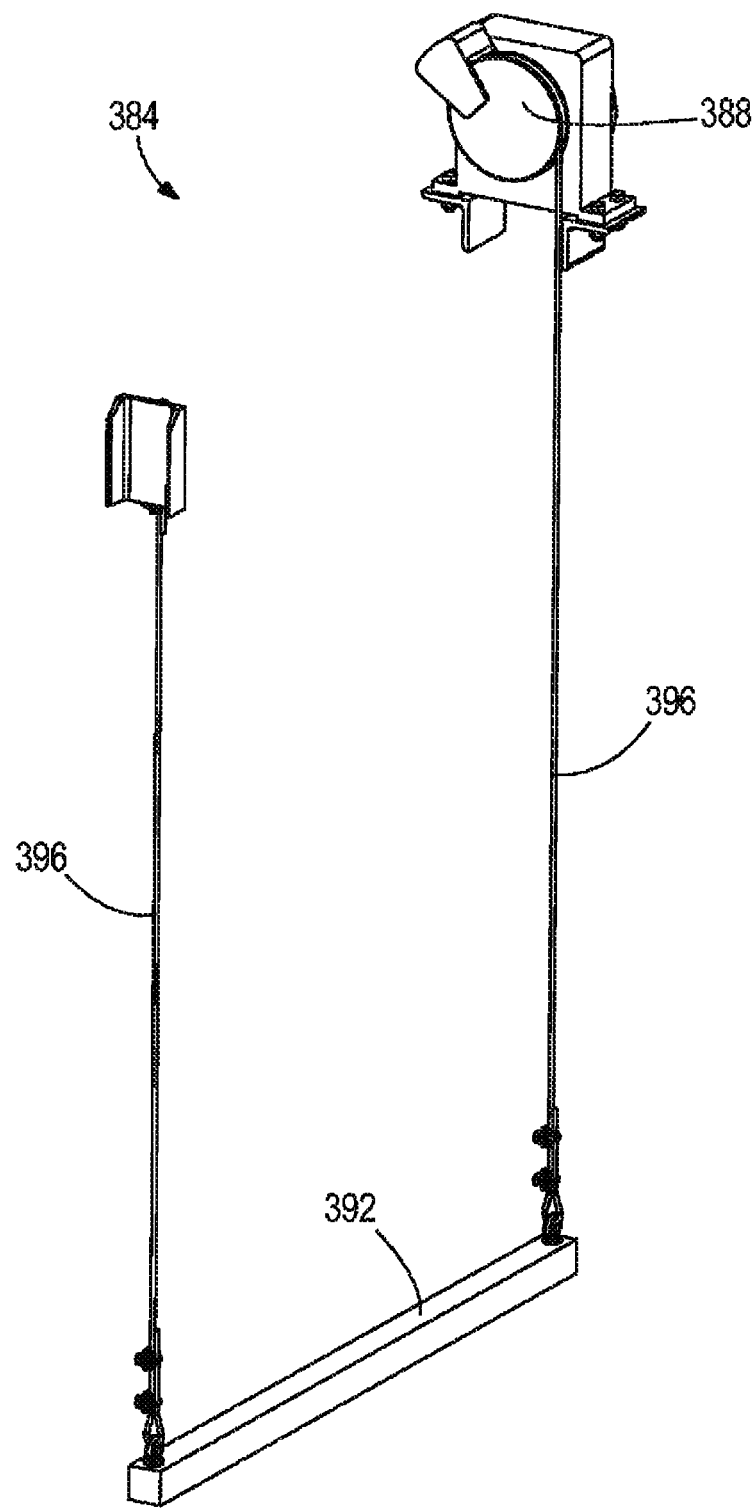
FIG. 20 is a perspective view of a weighted limit switch portion of the upper beam assembly of FIG. 16.

With reference to FIGS. 17, 18, and 20, the upper beam assembly 216 further includes a weighted limit switch 384. The weighted limit switch 384 is configured to shut down the prime mover 224 and/or the gearbox motors 308 in the event the cask transport assembly 210 begins to tilt and/or sway too far in one or more directions. For example, during an earthquake or other seismic event, the cask transport assembly 210 may begin to sway. Attempting to use the cask transport assembly 210 during this event could damage the cask transport assembly 210, any structure coupled to the cask transport assembly 210, and/or any structure nearby the cask transport assembly 210.

As illustrated in FIG. 20, the weight limit switch 384 includes a sensor 388. The sensor 388 is coupled to the sheave 264, though in other constructions the sensor 388 is coupled elsewhere in the upper beam assembly 216. Beneath the sensor 388 is a weighted swing bar 392. The swing bar 392 is coupled to the sensor 388 with two wires 396. The swing bar 392 is free to swing underneath the sheave 264. In the event the swing bar 392 swings too far in one direction, the sensor 388 senses the movement, and an electrical connection is broken within the sensor 388, thereby shutting down operation of the prime mover 224 and/or the gearbox motors 308.

With reference to FIGS. 17-19, the upper beam assembly 216 further includes conduits 398. The conduits 398 are coupled to the pin 268 of the sheave 264, and are used to provide lubrication from an outside source (not shown) located either within the cask transport 210 or outside of the cask transport 210 to the pin 268. Four conduits 398 are provided, with two conduits 398 directed toward a first end of the pin 268, and the remaining two conduits 398 directed toward an opposite end of the pin 268. Other constructions include different numbers or arrangements of conduits 398.

Figure 16:
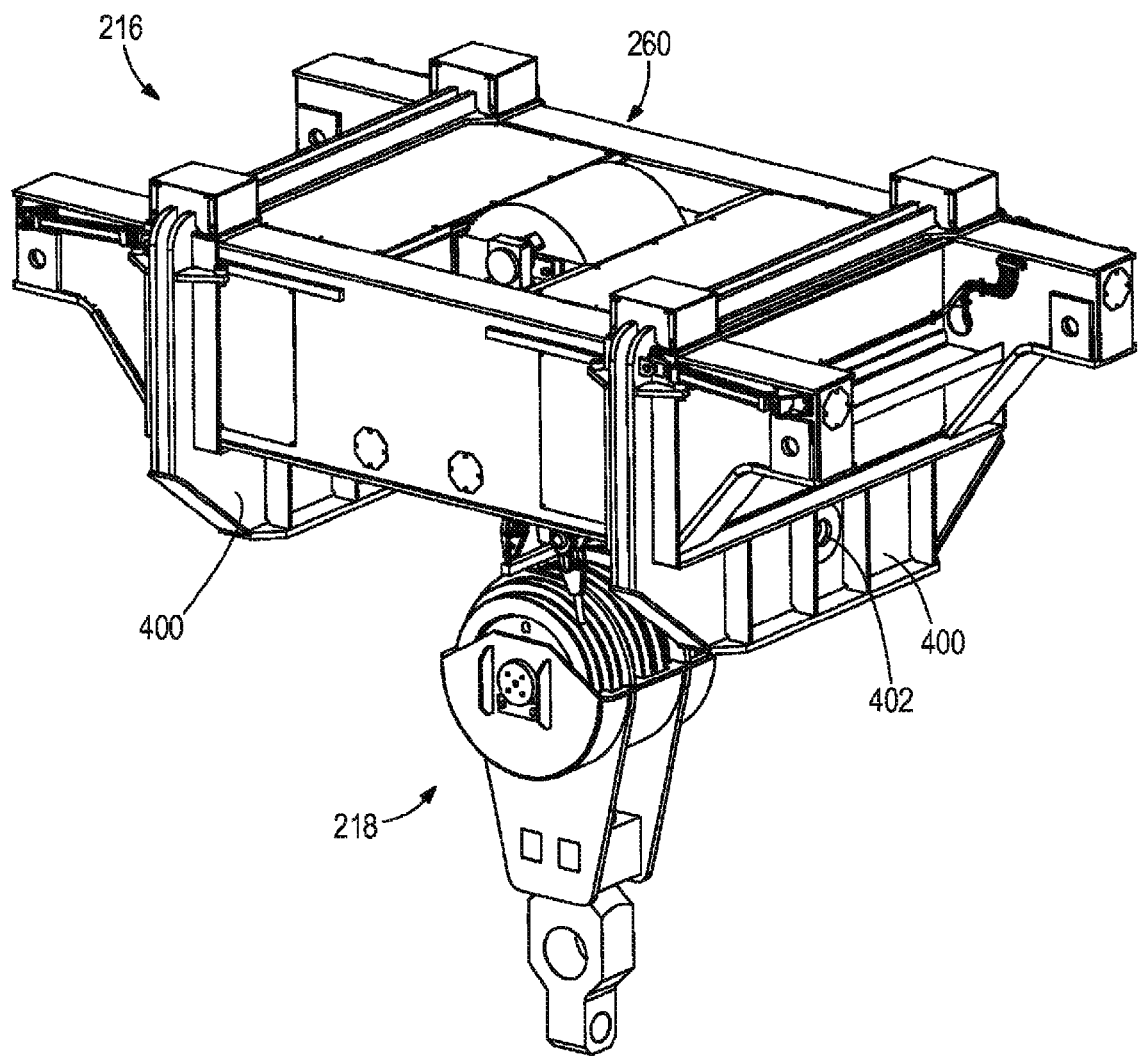
FIG. 16 is a perspective view of an upper beam assembly and bottom block assembly of the cask transport assembly of FIG. 14.

With reference to FIGS. 16 and 24, the upper beam assembly 216 further includes support arms 400. The support arms 400 are similar to the support arms 116 described above for the cask transport assembly 210. The support arms 400 are rigid structures extending vertically beneath the upper beam assembly 216, and are used to releasably couple to devices that are being transported (e.g., a cask storage container). Two support arms 400 are illustrated, though in other constructions different numbers or arrangements of support arms 400 are used. Each of the support arms 400 includes a coupling component 402, for example in the form of an opening as seen in FIG. 16, that is used to releasably couple the support arm 400 to a device to be transported.

With reference to FIGS. 27-35, a method of using a vertical cask transport is illustrated. While the Figures illustrate vertical cask transport 10, the method applies equally to vertical cask transport 210.

Figure 27:
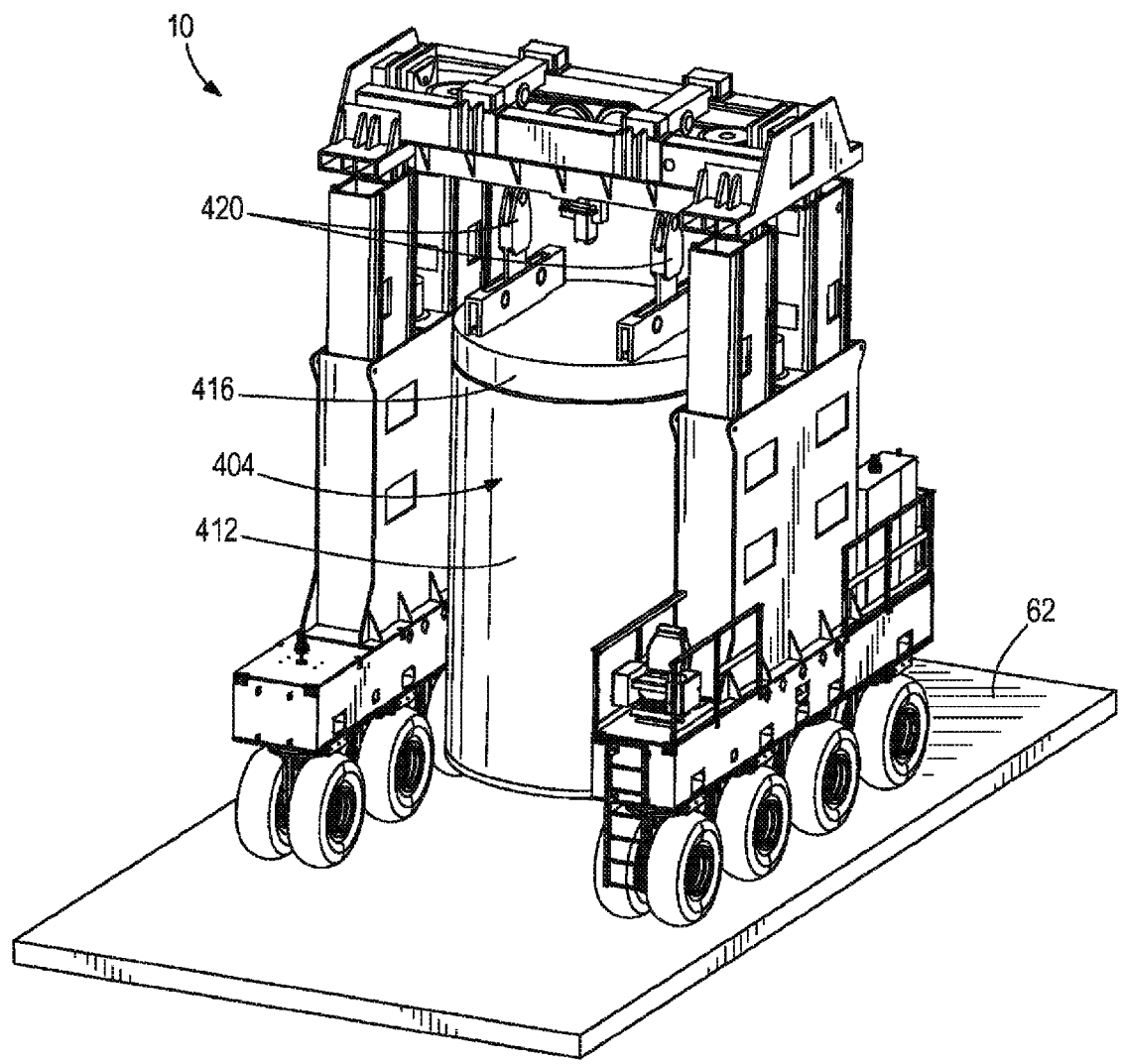
FIG. 27 is a perspective view of a cask transport assembly, such as the cask transport assembly of FIG. 1 or FIG. 14, coupled to and transporting a storage tank.
Figure 28:
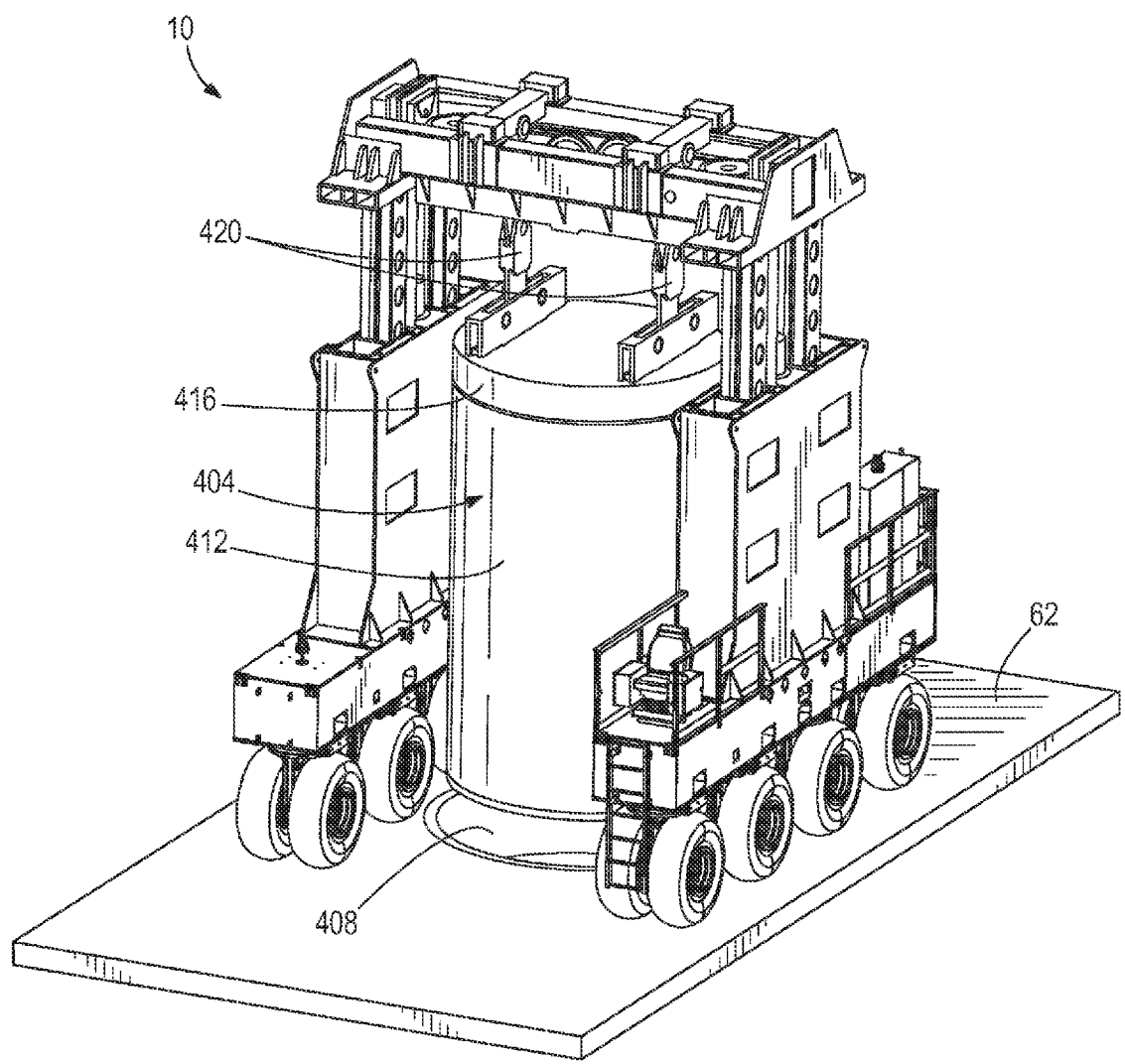
FIG. 28 is a perspective view of the cask transport assembly lowering the storage tank into a pit.

With reference to FIGS. 27 and 28, the method includes transporting a storage tank 404 to a storage pit 408. The storage tank 404 includes a base 412, a cover 416 releasably coupled to the base 412, and rigid coupling arms 420 releasably coupled to the cover 416. The coupling arms 420 are releasably coupled to the support arms 116 of the upper beam assembly 16.

As illustrated in FIGS. 27 and 28, the moving frames 40, 42 and/or 48, 50, are raised slightly to allow for clearance between the bottom of the storage tank 104 and the ground surface 62. With the storage tank 404 secured to the vertical cask transport 10, the vertical cask transport 10 is moved along the ground surface 62 until the storage tank 404 is positioned directly over the pit 408.

Figure 29:
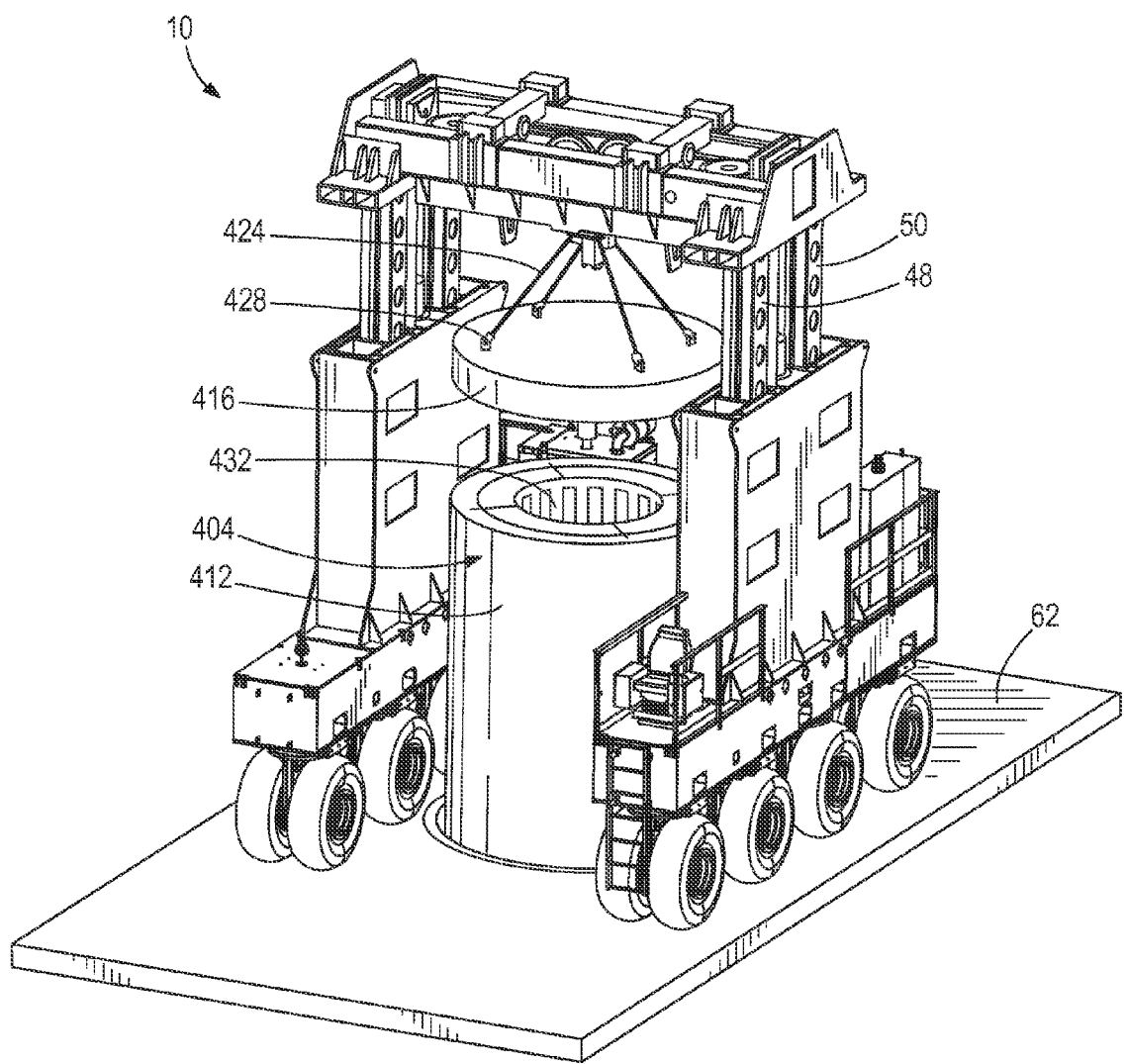
FIG. 29 is a perspective view of the cask transport assembly removing a lid off of the storage tank.

With reference to FIG. 29, the storage tank 404 is then lowered into the pit 408 by moving the frames 40, 42 and/or 48, 50 down, until the storage tank 404 is resting in the pit 408. With the storage tank 404 inside the pit 408, the coupling arms 420 are removed, and a four-point harness 424 is coupled to both the bottom block assembly 18 and to shackles 428 located along the cover 416. Other constructions utilize devices other than a four-point harness. The cover 416 is then removed (e.g., by raising the frames 40, 42 and/or 48, 50), thereby exposing an interior chamber 432 inside the base 412.

Figure 30:
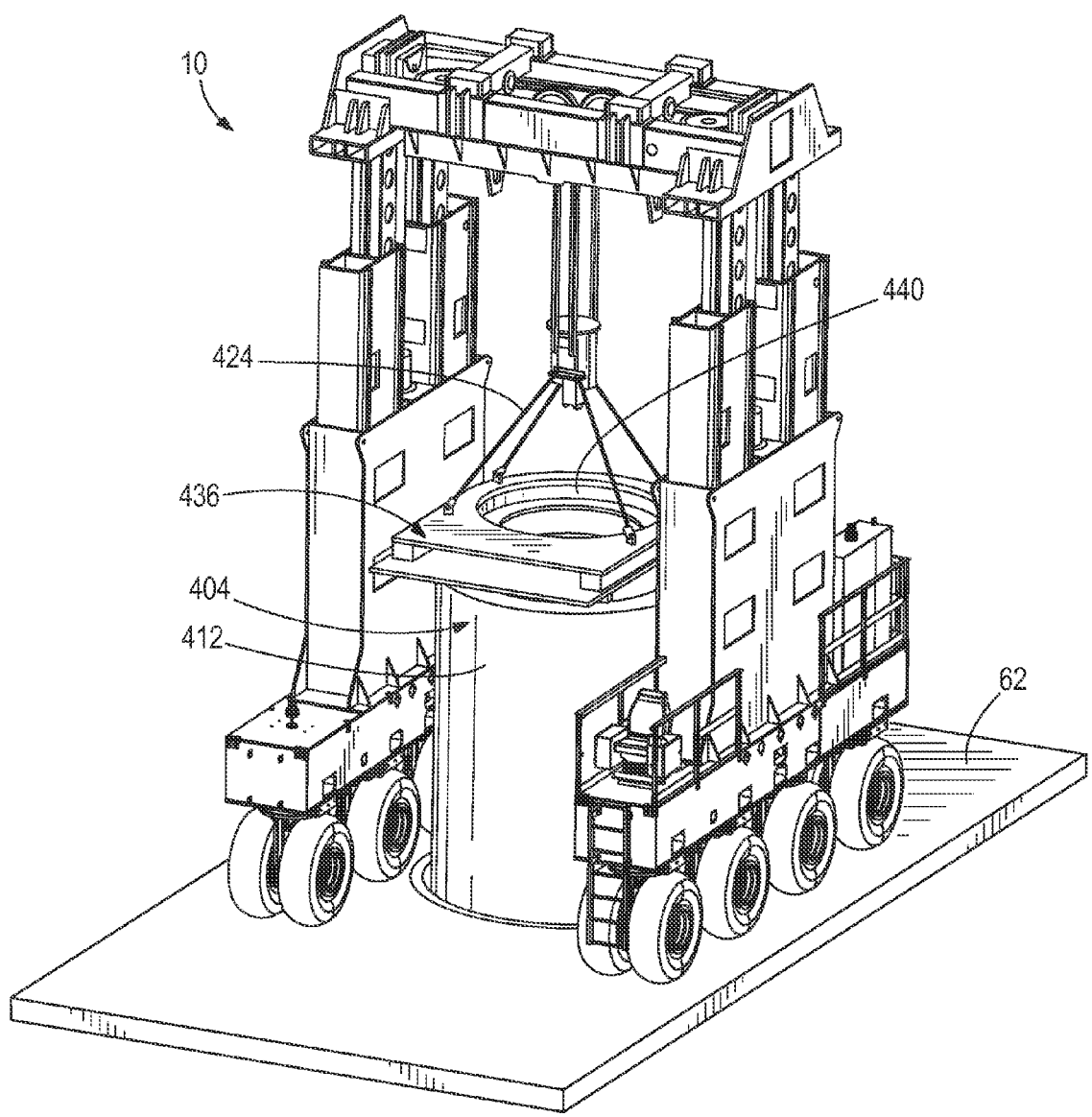
FIG. 30 is a perspective view of the cask transport assembly lowering a mating device on top of a base portion of the storage tank.

With reference to FIG. 30, after the cover 416 is removed, a mating device 436 is placed on top of the exposed the base 412. The same four-point harness 424 that was used to move the cover 416 is also used to move the mating device 436 into position. The mating device 436 includes an opening 440 corresponding to, and aligned with, the chamber 342. The mating device 436 rests on top of the base 412, although in other constructions the mating device 436 is releasably coupled to the base 412.

Figure 31:
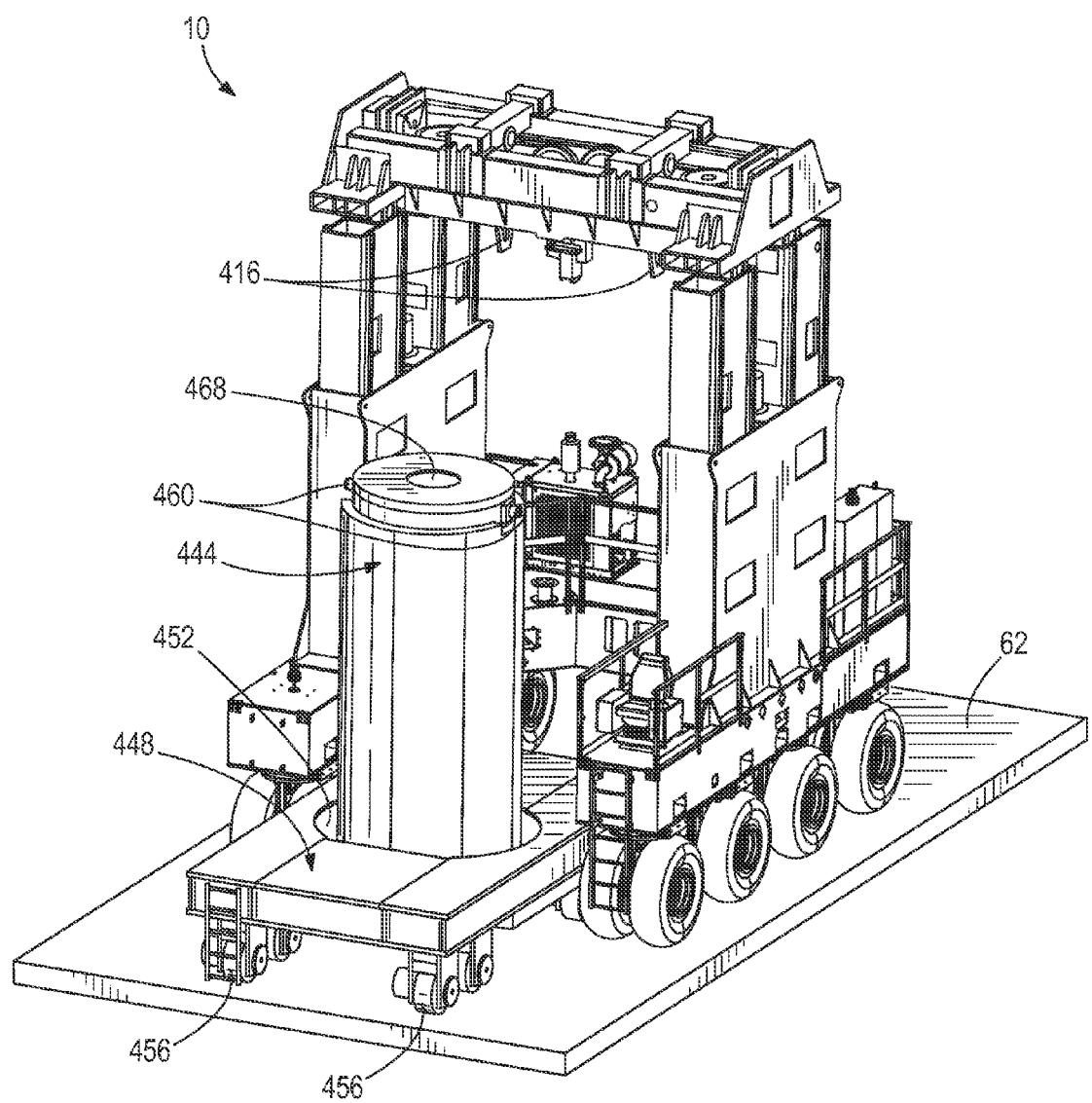
FIG. 31 is a perspective view of a dolly transporting a cask to the cask transport assembly.
Figure 32:
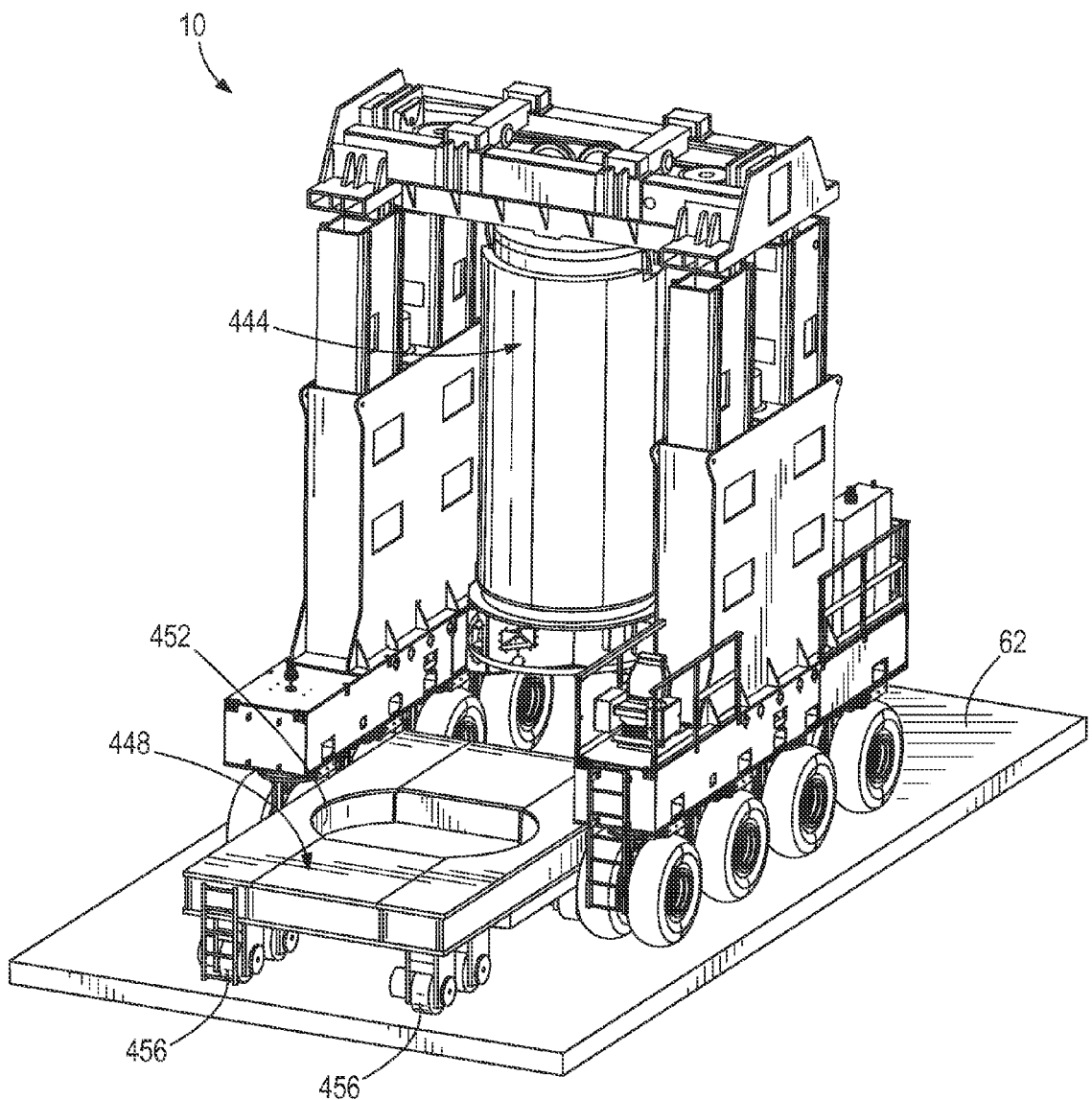
FIG. 32 is a perspective view of the cask transport assembly coupled to, and raising, the cask.

With reference to FIGS. 31 and 32, after the storage tank 404 has been lowered into the pit 408, the vertical cask transport 10 is used to transport a cask 444 to the storage tank 404. To transport the cask 444, the cask 444 is first moved underneath vertical cask transport 10 with a dolly 448. The dolly 448 includes a recessed area 452 and wheels 456. The cask 444 sits within the recessed area 452, and rides along with the dolly as the dolly moves over the ground surface 62.

With the cask 444 positioned underneath the upper beam assembly 16, the upper beam assembly 16 is lowered. Specifically, the frames 40, 42 and/or 48, 50 are lowered, until the support arms 116 are positioned adjacent two outwardly protruding pins 460 on the cask 444. The cask 444 is then coupled to the support arms 116, for example by inserting the pins 460 through the coupling components 118 on the support arms 116. Other constructions include different methods by which the cask 444 may be coupled to the upper beam assembly 16. With the cask 444 coupled to the supper beam assembly 16, the upper beam assembly 16 is raised, thereby lifting the cask 444 off of the dolly 448 so that the vertical cask transport 10 and cask 444 may be moved together toward the pit 408.

Figure 33:
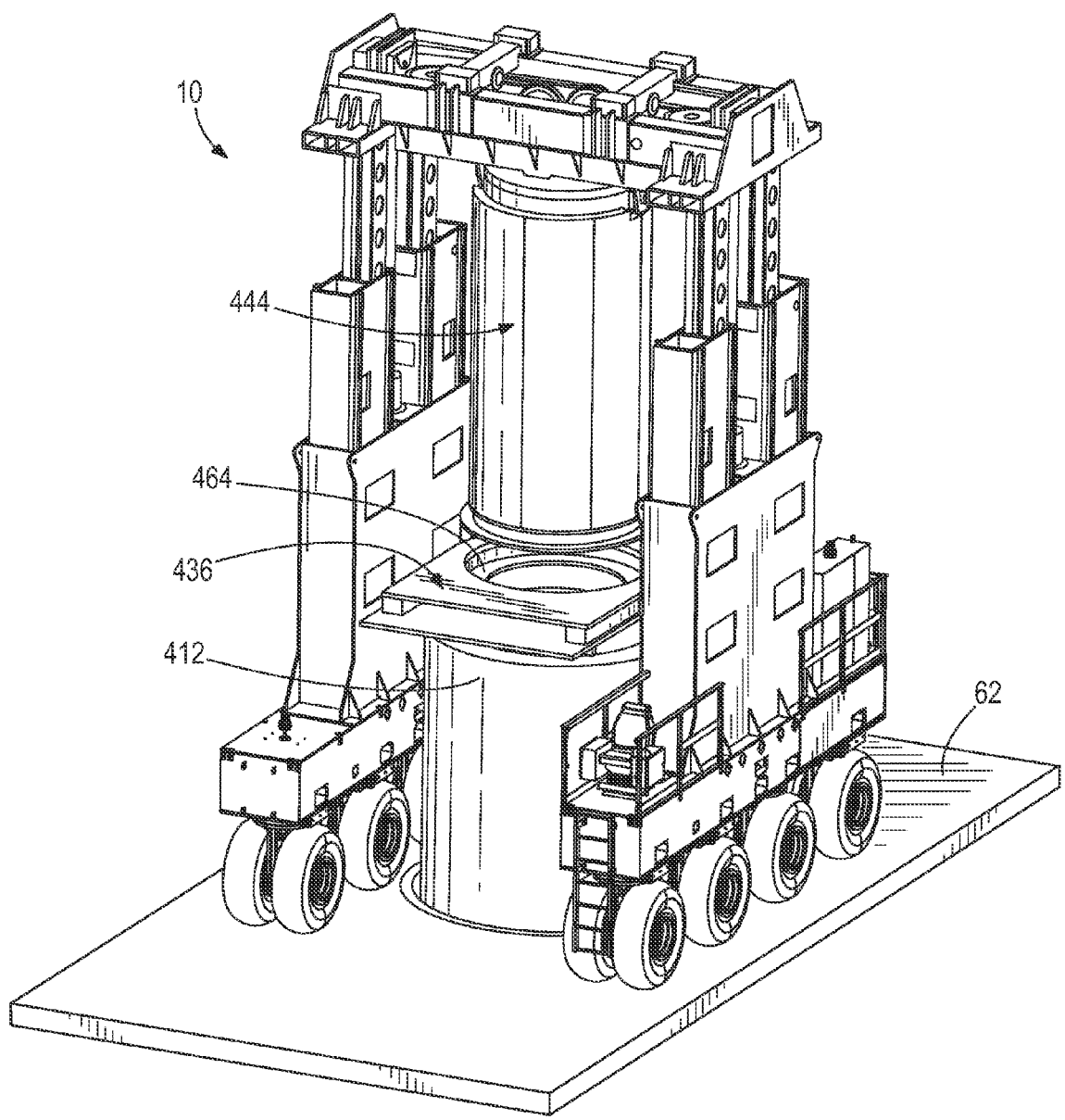
FIG. 33 is a perspective view of the cask transport assembly positioning the cask over the mating device.
Figure 34:
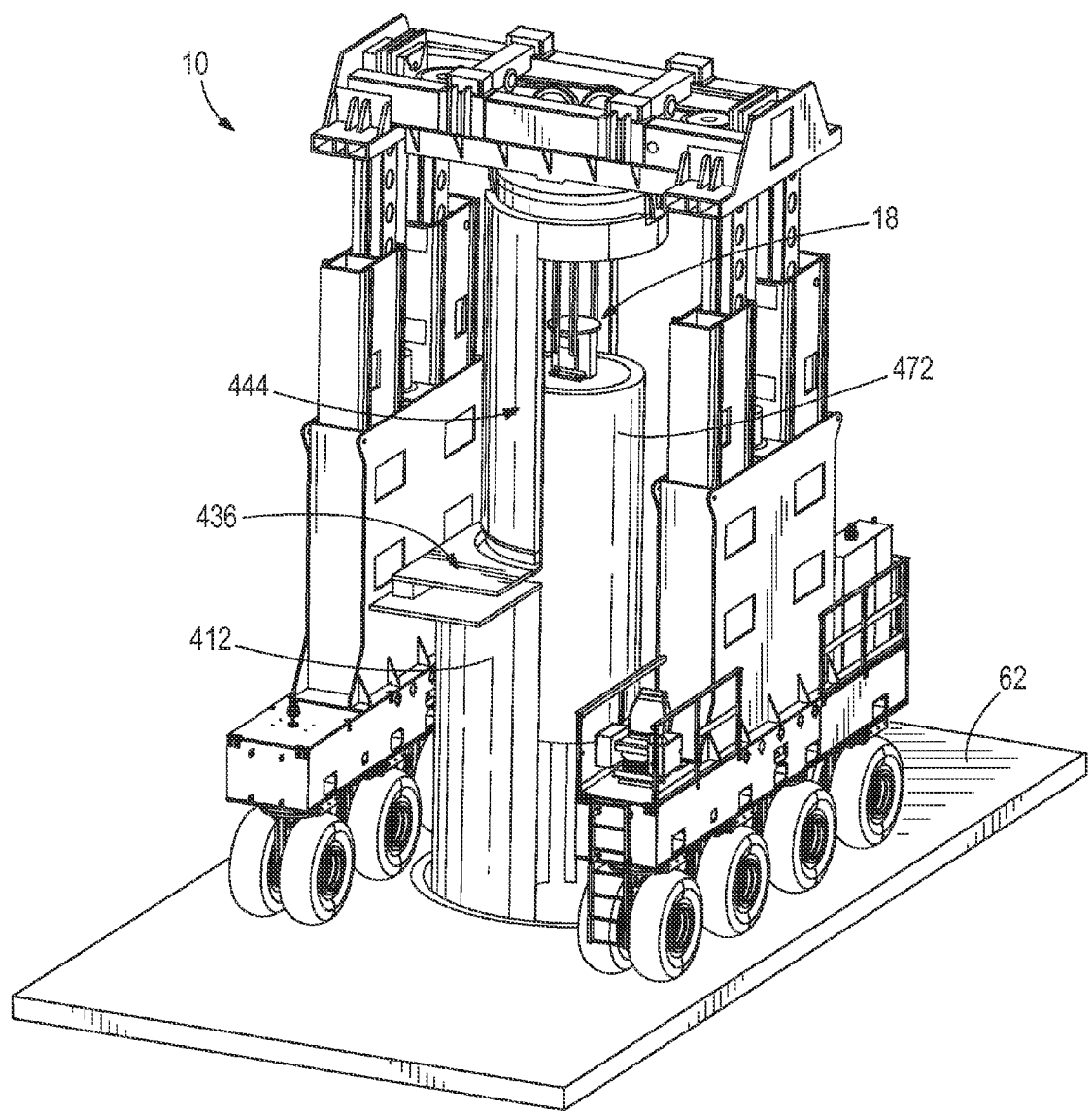
FIG. 34 is a perspective view of the cask transport assembly lowering a canister disposed within the cask, into the storage tank.

With reference to FIGS. 33 and 34, once the vertical cask transport 10 arrives at the pit 408, the cask 444 is positioned over the mating device 436. The cask 444 is then lowered down onto the mating device 436. The mating device 436 includes an inner ridge 464. The cask 444 is lowered until it rests along the inner ridge 464, with the cask 444 nested partially within the mating device 436.

With reference to FIGS. 31 and 34, the cask 444 includes an opening 468 along its top surface. Beneath the opening 468, and disposed within the cask 444, is a multi-purpose canister 472. The canister 472 contains, for example, spent nuclear fuel and/or other material intended for storage within the storage tank 404. As illustrated in FIG. 34, the method includes lowering the bottom block assembly 18 down through the opening 468 and coupling the bottom block assembly 18 to the canister 472. The compact design of the bottom block assembly 18 permits the bottom block assembly 18 to fit inside this opening 468.

While not illustrated, the cask 444 further includes a lower cover that is removable from the cask 444. Once this lower cover is removed, the upper beam assembly 16 is then used to lower the bottom block assembly 18, and the coupled canister 472, down into the storage tank 404. In particular, the pulley systems of upper assembly 16, or in the case of cask transport 210 the winch drum and sheave systems of upper assembly 216, are used to lower the canister down into the chamber 432 of the storage tank 404.

As illustrated in FIG. 34, the alignment of the storage tank 404, the mating device 436, and the canister 472 facilitates a smooth, downward movement of the canister 472 into the chamber 432 of the storage tank 404. The cask transport assembly 10 (and similarly the cask transport 210) thus has the ability to secure both the cask 444 and the canister 472 at the same time. This not only reduces the number of lift operations, but also allows the entire operation to be seismically qualified.

Figure 35:
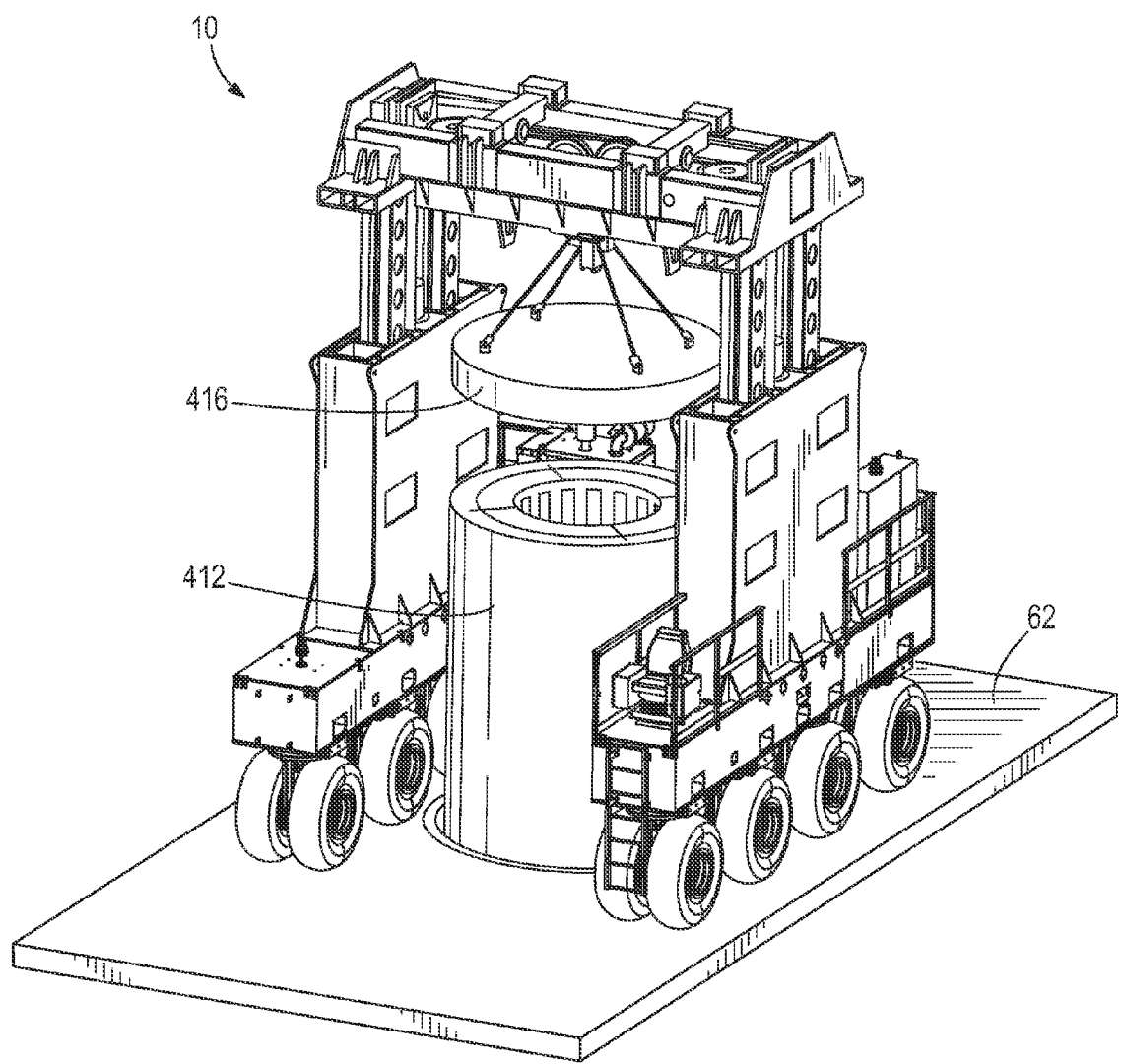
FIG. 35 is a perspective view of the cask transport assembly replacing the lid back on the storage tank.

With reference to FIG. 35, once the canister 472 has been inserted into the chamber 432, the cask 444 and mating device 436 are removed, for example with the four-point harness 424. The cover 416 is then re-attached to the base 412.

Figure 36:
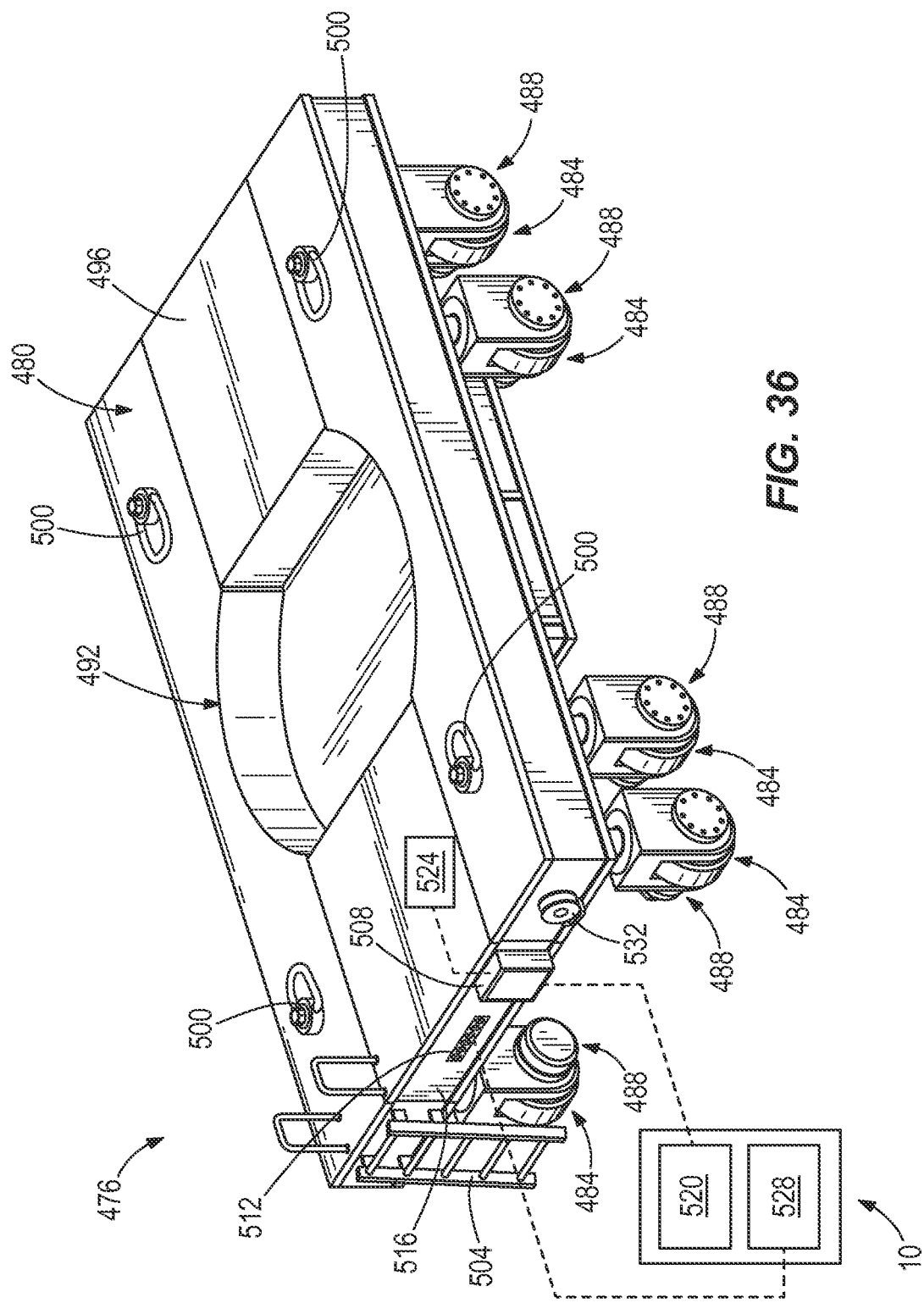
FIG. 36 is a perspective view of a dolly according to another construction of the invention.

With reference to FIG. 36, a dolly 476 according to another construction of the invention includes a frame 480 supported by and movable via a set of wheels 484 underneath the frame 480. Similar to the dolly 448, the dolly 476 is a low profile transport device able to move a cask (e.g., cask 444) or other object from one location to another.

In the illustrated construction, the wheels 484 of the dolly 448 are solid steel, with polyurethane tread. Other constructions include different materials for the wheels 484. The wheels 484 are coupled to pivotable wheel struts 488, to permit turning and steering of the dolly 476 as the dolly 476 traverses along a surface. In the illustrated construction, the pivotable wheel struts 488 are each pivotable (about an axis perpendicular to the frame 480) up to an angle of 12 degrees in either direction, providing an overall 24 degree range of steering motion for the dolly 476. Other constructions include different values and ranges of angles, including ranges exceeding 24 degrees of overall steering motion. In the illustrated construction, the dolly 476 includes four front wheels 484 and four rear wheels 484, each coupled to one of the wheel struts 488, such that all eight wheel struts 488 are pivotable to permit turning and steering of the dolly 476. In some constructions the dolly 476 uses hydraulics or pneumatics to independently control the steering of the wheels 484 and the wheel struts 488. In some constructions, the dolly 476 includes articulated steering (e.g., crab, circle, proportional). In some constructions, the dolly 476 includes redundant steering or steering drives.

With continued reference to FIG. 36, the wheel struts 488 and the wheels 484 are each independently adjustable (e.g., vertically) relative to the frame 480 (e.g., via hydraulics or pneumatics). For example, in FIG. 36, one of the wheels 484 and wheel struts 488 is shown raised up close to the frame 480, while other wheels 484 and wheel struts 488 are extended farther away from the frame 480. The wheels 484 and the wheel struts 488 form an independent suspension on the dolly 476, which allows the dolly 476 to climb up an obstacle (e.g., a curb) one wheel or set of wheels at a time, if desired, while keeping the frame 480 level relative to a ground surface at all times (i.e., to climb without tilting the frame 480). The independent suspension also allows the dolly 476 to adjust a height the frame 480 relative to the ground surface. In some constructions, the wheel struts 488 and wheels 484 are adjustable at least eight inches relative to the frame 480. Other constructions include different values and ranges.

With continued reference to FIG. 36, the frame 480 is rectangular, although other constructions include different shapes and sizes than that shown. The frame 480 includes at least one recessed area (e.g., well) 492 disposed along a top surface 496 of the frame 480. Similar to the dolly 448, the recessed area 492 receives and holds at least a portion of an item, such as the cask 444, as the dolly 476 moves from one location to another. In some constructions more than one recessed area 492 is provided.

The dolly 476 also includes securing mechanisms 500 disposed along the top surface 496 of the frame 480. In the illustrated construction, the securing mechanisms 500 are four shackles spaced around the recessed area 492 that serve as tie-downs. Other constructions include different types, numbers, and arrangement of securing mechanisms 500 than those shown. The securing mechanisms 500 are used to secure a load (e.g., the cask 444) to the dolly 476. For example, when the cask 444 is disposed at least partially in the recessed area 492, a series of ropes, chains, cables, or other elements, may be used to secure the cask 444 further to the dolly 476 by coupling (e.g., tying) portions of the ropes, chains, or cables to the securing mechanisms 500 and to the dolly 476. By utilizing the recessed area 492 and securing mechanisms 500, the dolly 476 is able to safely transport items (e.g., casks) of various sizes.

With continued reference to FIG. 36, the dolly 476 further includes a ladder 504 to provide access to the top surface 496, as well as at least one electrical connector 508 (e.g., an electrical junction box and/or a controller) and at least one hydraulic or pneumatic connector 512 (e.g., an hydraulic quick disconnect). In the illustrated construction, the electrical connector 508 and the hydraulic or pneumatic connector 512 are disposed along a side surface 516 of the frame 480, and the electrical connector 508 and the hydraulic or pneumatic connector 512 are both coupled to the vertical cask transport 10. Specifically, the electrical connector 508 is coupled wirelessly to a controller 520 (e.g., a remote belly box) on the vertical cask transport 10, so that an operator on the cask transport 10 is able to use the controller 520 to remotely and wirelessly control movement of the dolly 476. In some constructions, the dolly 476 is controlled with pendents or other hand-held controllers on the cask transport 10 (or elsewhere). In some constructions, the electrical connector 508 is coupled via a wire or wires to a remotely located controller (e.g., to the controller 520). In some constructions, the dolly 476 is controlled with an operator and a controller on the dolly 476 itself, without connection to a remote controller.

In the illustrated construction, the electrical connector 508 includes or is coupled to a motor 524 on the dolly 476 that generates power for movement and steering of the wheels 484, based on signals received by the electrical connector 508 from the controller 520. In some constructions the motor 524 generates power for the hydraulic or pneumatic vertical movement of the wheels 484 and the wheel struts 488 relative to the frame 480, based on signals received by the electrical connector 508 from the controller 520.

In some constructions, plug and play technology is utilized to control movement of the dolly 476. For example, in some constructions at least one of the electrical connector 508 and the hydraulic or pneumatic connector 512 includes a plug and play device.

In the illustrated construction, the hydraulic or pneumatic connector 512 is coupled to a source of operating medium 528 (e.g., hydraulic fluid on the cask transport 10 or elsewhere), which is used to control steering and/or the independent vertical movement of each of the wheels 484 and the wheel struts 488 relative to the frame 480. In some constructions, the source of operating medium 528 is disposed in the dolly 476 itself, and the hydraulic or pneumatic connector 512 is a further electrical connection specifically designed for controlling use of the operating medium 528 located in the dolly 476 (i.e., for controlling the hydraulic or pneumatic vertical adjustments of the wheel struts 488).

In the illustrated construction, the dolly 476 also includes a cable reel 532 disposed along the side surface 516. The cable reel 532 is used to store, receive, and distribute cable (e.g., wire cable), such that movement of the dolly 476 may be controlled and limited. For example, in some constructions, the dolly 476 operates similar to a cable car, and travels along rails built into a ground surface. As the dolly 476 travels along the rails, the cable reel 516 winds and unwinds a cable that is coupled to another object (e.g., the cask transport 10, an anchor, platform, etc.). The cable limits the extent to which the dolly 476 may travel. Other constructions do not include the cable reel 532.

Use of the cable reel 532 is particularly useful in nuclear applications, because using the cable reel 532 helps to cut down or eliminate carbon monoxide omission and diesel fuel capacity due to fire load. For example, in some constructions the cable reel 532 acts as an umbilical cord to supply power and controls to the dolly 476 (e.g., from the cask transport 10 which is located inside or outside of a building) while the dolly 476 is inside or outside of a building, thereby preventing issues or concerns with carbon monoxide and fire load.

With continued reference to FIG. 36, in the illustrated construction the dolly 476 is a completely self-contained, self-propelled vehicle with independent steering that allows transport of the cask 444 from a nuclear reactor's fuel building to the cask transport 10. The independent suspension of the dolly 476 advantageously provides a level ride height for the cask 444 as the dolly 476 climbs up an obstacle (e.g., a six inch curb) at the fuel building entrance. Thus, the dolly 476 is able to run and operate not only on flat ground and on rails, but also on surfaces that do not include rails, and surfaces that are uneven, making the dolly 476 safe, reliable, and versatile. The dolly 476 is single failure proof, is seismically qualified, and conforms to ASME NOG-1-2004. In some constructions, the rated load for the dolly 476 is 126 ton minimum, and the wheel load is 60 KIPS.

Although the invention has been described in detail with reference to certain preferred constructions, variations and modifications exist within the scope and spirit of one or more independent aspects of the invention as described.

What is claimed is:

1. A low profile transport device comprising:
    a frame having a top surface and a recess disposed along the top surface to hold and transport an object;
    a plurality of wheels disposed below the frame that support the frame;
    a plurality of pivotable wheel struts coupled to the wheels, wherein each wheel strut is coupled to exactly one wheel such that the number of wheel struts equals the number of wheels, wherein the wheels and the wheel struts form an independent suspension, such that the wheel struts are each individually adjustable relative to the frame, from a first position relative to the frame to a second position relative to the frame to allow the low profile transport device to climb an obstacle without tilting the frame; and
    a motor that generates movement of the wheels.

2. The low profile transport device of claim 1, further comprising a controller in communication with the motor, wherein the controller is configured to independently control the steering of each wheel and to generate articulated steering of the wheels.

3. The low profile transport device of claim 2, wherein the motor generates the movement of the wheels based on signals received at the controller.

4. The low profile transport device of claim 2, wherein the motor generates pressure in an operating medium for the adjustment of the wheel struts, based on signals received at the controller.

5. The low profile transport device of claim 2, wherein the articulated steering includes at least one of crab, circle, or proportional steering.

6. The low profile transport device of claim 1, further comprising an hydraulic or pneumatic connector disposed along an outer surface of the frame, wherein the hydraulic or pneumatic connector directs operating medium to the wheel struts.

7. The low profile transport device of claim 1, wherein each of the wheels is comprised of solid steel with polyurethane tread.

8. The low profile transport device of claim 1, wherein the plurality of wheels includes eight wheels, and wherein the plurality of wheel struts includes eight wheel struts.

9. The low profile transport device of claim 1, wherein each of the wheel struts is individually adjustable at least eight inches relative to the frame.

10. The low profile transport device of claim 1, further comprising a plurality of tie-down shackles disposed along the top surface to secure an object within the recessed area.

11. The low profile transport device of claim 1, wherein the frame is rectangular, wherein the recess forms a well along a top of the frame to receive a nuclear cask, and wherein the low profile transport device further comprises a cable reel coupled to the frame.

12. The low profile transport device of claim 1, wherein the wheel struts are each individually adjustable relative to the frame via hydraulics or pneumatics.

13. The low profile transport device of claim 1, wherein the low profile transporter device conforms to ASME NOG-1-2004.

14. The low profile transport device of claim 1, wherein each wheel strut is pivotable to permit turning and steering of the low profile transporter device.

15. A system for transporting a cask comprising:
a cask transport device including:
a support assembly including a plurality of support assembly wheels and a support frame coupled to and supported by the support assembly wheels;
a tower disposed above the support assembly;
an upper beam assembly coupled to the tower frame;
a bottom block assembly coupled to the upper beam assembly, the bottom block assembly movable from a first vertical position relative to the upper beam assembly to a second vertical position relative to the upper beam assembly; and
a controller; and
the low profile transport device of claim 1, wherein the low profile transport device includes a controller, wherein the controller on the low profile transporter and the controller on the cask transport device are each configured such that movement of the low profile transport device is controlled via the controller on the cask transport device.

16. The system of claim 15, wherein the controller of the low profile transport device is in communication with the motor, wherein the controller on the low profile transport device is configured to independently control the steering of each wheel and to generate articulated steering of the wheels.

17. The system of claim 16, wherein the motor of the low profile transport device generates the movement of the wheels on the low profile transport device based on signals received at the controller on the low profile transport device from the controller on the cask transport device.

18. The system of claim 16, wherein the motor of the low profile transport device generates hydraulic or pneumatic pressure for the adjustment of the wheel struts on the low profile transport device, based on signals received at the controller on the low profile transport device from the controller on the cask transport device.

19. The low profile transport device of claim 16, wherein the articulated steering includes at least one of crab, circle, or proportional steering.

20. The system of claim 15, wherein the low profile transport device includes an hydraulic or pneumatic connector disposed along an outer surface of the frame of the low profile transport device, wherein the hydraulic or pneumatic connector directs operating medium to the wheel struts on the low profile transport device.

21. The system of claim 20, wherein cask transport device includes a source of the operating medium, such that the operating medium is movable from the cask transport device to the low profile transport device via the hydraulic or pneumatic connector.

22. The system of claim 15, wherein the plurality of wheels on the low profile transport device includes eight wheels, and wherein the plurality of wheel struts on the low profile transport device includes eight wheel struts.

23. The system of claim 15, wherein each of the wheel struts on the low profile transport device is individually adjustable at least eight inches relative to the frame of the low profile transport device.

24. The system of claim 15, further comprising a plurality of tie-down shackles disposed along the top surface of the low profile transport device to secure an object within the recessed area.

25. The system of claim 15, wherein each of the wheels comprises solid steel with a polyurethane tread.

* * * * *